US010820707B2

(12) United States Patent
Patel

(10) Patent No.: US 10,820,707 B2
(45) Date of Patent: Nov. 3, 2020

(54) BRACKET

(71) Applicants: Roger Thomas Mascull, Ashburton (NZ); Elizabeth Jocelyn Mascull, Ashburton (NZ)

(72) Inventor: Anil Raman Patel, Brimingham (GB)

(73) Assignee: Roger Thomas Mascull and Elizabeth Jocelyn Mascull, Ashburton (NZ), as Trustees of the RT and EJ Mascull Family Trust ( * ) Notice: Subject to any disclaimer, the term of this patent is extended or adjusted under 35 U.S.C. 154(b) by 0 days.

(21) Appl. No.: 15/552,991

(22) PCT Filed: Feb. 19, 2016

(86) PCT No.: PCT/NZ2016/050022
§ 371 (c)(1),
(2) Date: Aug. 23, 2017

(87) PCT Pub. No.: WO2016/137338
PCT Pub. Date: Sep. 1, 2016

(65) Prior Publication Data
US 2018/0014651 A1 Jan. 18, 2018

(30) Foreign Application Priority Data

Feb. 23, 2015 (NZ) ........................ 705331

(51) Int. Cl.
*A47C 7/46* (2006.01)
*A61G 5/10* (2006.01)
(Continued)

(52) U.S. Cl.
CPC ............ *A47C 7/462* (2013.01); *A61G 5/1048* (2016.11); *A61G 5/122* (2016.11); *F16C 11/04* (2013.01);
(Continued)

(58) Field of Classification Search
CPC ...... A47C 7/462; A61G 5/1048; A61G 5/122; A61G 2200/52; A61G 2210/10; F16C 11/04
See application file for complete search history.

(56) References Cited

U.S. PATENT DOCUMENTS 1,527,754 A * 2/1925 Simon .................. A61G 5/1059
601/24
2,102,069 A * 12/1937 Hanicke .................. A61F 5/055
602/18
(Continued)

FOREIGN PATENT DOCUMENTS

WO 2006/047341 5/2006
WO 2014/126483 8/2014
(Continued)

OTHER PUBLICATIONS

International Search Report for International Application No. PCT/NZ2016/050022 dated Apr. 28, 2016 (5 pages).
(Continued)

*Primary Examiner* — Kimberly T Wood
(74) *Attorney, Agent, or Firm* — Merchant & Gould P.C.

(57) ABSTRACT

The invention relates to a postural support bracket for attaching to at least one postural support. The bracket is adapted to allow the postural support to adopt a variety of different positions, including positions in which the postural support is tilted. In one embodiment, the postural support bracket comprises a hinged region that when attached to one or more postural supports, allows the postural support to adopt a variety of different angles.

12 Claims, 20 Drawing Sheets

(51) Int. Cl.
 *A61G 5/12* (2006.01)
 *F16C 11/04* (2006.01)

(52) U.S. Cl.
 CPC ...... *A61G 2200/52* (2013.01); *A61G 2210/10* (2013.01)

(56) References Cited

U.S. PATENT DOCUMENTS

| | | | | |
|---|---|---|---|---|
| 3,012,270 A * | 12/1961 | Reid | ............... | E05D 11/1007 16/326 |
| 3,640,571 A * | 2/1972 | Keropian | ............. | A61G 5/12 297/464 |
| 3,704,910 A * | 12/1972 | Willcott | ............. | A47C 1/03 297/464 |
| 3,730,589 A * | 5/1973 | Lane | ............. | A61G 5/12 297/391 |
| 4,073,537 A * | 2/1978 | Hammersburg | ..... | A61G 5/12 297/464 |
| 4,617,919 A * | 10/1986 | Suhre | ............. | A61F 5/3792 128/845 |
| 4,635,999 A * | 1/1987 | Simpson | ............. | B64D 11/06 297/88 |
| 4,647,066 A * | 3/1987 | Walton | ............. | A47C 7/405 280/47.4 |
| 4,793,652 A | 12/1988 | Hannah et al. | | |
| 4,813,746 A * | 3/1989 | Mulholland | ............. | A61G 5/12 297/464 |
| 4,981,325 A * | 1/1991 | Zacharkow | ............. | A47C 7/405 297/230.14 |
| 4,988,114 A * | 1/1991 | Thornton, Jr. | ............. | A61G 5/12 280/304.1 |
| 5,009,467 A * | 4/1991 | McCoy | ............. | A47C 1/03 297/411.26 |
| 5,286,087 A * | 2/1994 | Elton | ............. | B60N 2/66 297/284.1 |
| 5,308,028 A * | 5/1994 | Kornberg | ............. | A61G 5/121 248/118 |
| 5,362,082 A * | 11/1994 | Kornberg | ............. | A61G 5/12 248/285.1 |
| 5,447,356 A * | 9/1995 | Snijders | ............. | A47C 7/405 297/284.3 |
| 5,542,746 A * | 8/1996 | Bujaryn | ............. | A47C 9/002 297/423.12 |
| 5,553,919 A * | 9/1996 | Dennis | ............. | A47C 7/462 297/284.8 |
| 5,678,798 A * | 10/1997 | Little | ............. | A61G 5/10 16/324 |
| 6,032,975 A * | 3/2000 | Hanson | ............. | A61G 5/00 280/250.1 |
| 6,095,611 A * | 8/2000 | Bar | ............. | A61G 5/1067 297/440.21 |
| 6,213,558 B1 * | 4/2001 | Axelson | ............. | A47C 7/425 297/464 |
| 6,257,664 B1 * | 7/2001 | Chew | ............. | A47C 7/405 297/284.9 |
| 6,361,118 B1 | 3/2002 | Melgarejo et al. | | |
| 6,378,947 B1 * | 4/2002 | Barber | ............. | A61G 5/1043 297/130 |
| 6,460,933 B1 * | 10/2002 | Bors | ............. | A61G 5/1067 297/284.9 |
| 6,659,563 B2 * | 12/2003 | Float | ............. | A47C 7/42 297/354.1 |
| 6,733,074 B2 * | 5/2004 | Groth | ............. | A47C 7/46 297/284.4 |
| 6,840,577 B2 * | 1/2005 | Watkins | ............. | A61G 5/1064 297/284.9 |
| 6,886,843 B1 * | 5/2005 | Papac | ............. | A61G 5/00 280/250.1 |
| 6,983,988 B1 * | 1/2006 | Lo | ............. | B62J 1/28 297/215.1 |
| 7,185,910 B2 * | 3/2007 | Beauchesne | ............. | A61G 5/10 280/650 |
| 7,278,688 B1 * | 10/2007 | Hung | ............. | A47C 7/024 297/285 |
| 7,857,394 B2 * | 12/2010 | Whelan | ............. | A61G 5/10 297/440.2 |
| 7,891,739 B2 * | 2/2011 | Cramer | ............. | A47C 7/42 297/440.2 |
| 8,328,215 B2 * | 12/2012 | Knopf | ............. | A61G 5/08 280/250.1 |
| 8,517,469 B1 * | 8/2013 | Hetzel | ............. | A61G 5/1067 280/250.1 |
| 8,567,863 B2 * | 10/2013 | Hetzel | ............. | A61G 5/1067 297/284.4 |
| 8,578,560 B1 * | 11/2013 | Swinehart | ............. | A61G 5/10 16/324 |
| 9,352,675 B2 * | 5/2016 | Walker | ............. | A47C 7/38 |
| 9,551,453 B2 * | 1/2017 | Walters | ............. | F16M 11/08 |
| 9,717,637 B2 * | 8/2017 | Bucher | ............. | A61G 5/124 |
| 2006/0192362 A1 * | 8/2006 | Makhsous | ............. | A61G 5/1043 280/250.1 |
| 2008/0157581 A1 * | 7/2008 | Whelan | ............. | A61G 5/1067 297/440.2 |
| 2009/0072510 A1 | 3/2009 | Mueller | | |
| 2010/0276974 A1 * | 11/2010 | Huttenhuis | ............. | A47C 7/42 297/284.3 |
| 2015/0335502 A1 * | 11/2015 | Dufresne | ............. | A47C 7/32 297/284.2 |
| 2016/0101006 A1 * | 4/2016 | Bucher | ............. | A61G 5/124 280/304.1 |
| 2016/0262965 A1 * | 9/2016 | Goeckel | ............. | A61G 5/1067 |

FOREIGN PATENT DOCUMENTS

| WO | 2014/126485 | 8/2014 |
|---|---|---|
| WO | 2015/174855 | 11/2015 |

OTHER PUBLICATIONS

International Search Report for International Application No. PCT/NZ2016/050022 dated Apr. 28, 2016 (11 pages).

European Search Report for EP Application No. 16 75 5970 dated Aug. 9, 2018 (5 pages).

* cited by examiner

BRACKET

This application is a National Stage Application of PCT/NZ2016/050022, filed 19 Feb. 2016, which claims benefit of Serial No. 705331, filed 23 Feb. 2015 in New Zealand and which applications are incorporated herein by reference. To the extent appropriate, a claim of priority is made to each of the above disclosed applications.

TECHNICAL FIELD

The invention relates to a bracket for a postural support.

BACKGROUND OF THE INVENTION

Postural supports are often used to help physically disabled people with high needs to maintain a particular position within a chair or seat, such as a wheelchair. Such supports are commonly used to support a person's trunk to assist the person to retain an upright position. Other supports may be used to support a person's hip to help retain the person's legs in a particular position or to support a person's head to prevent lolling of the head, which can cause neck strain.

The postural supports need to be moveable to fit different sized people and to satisfy the postural support requirements of different people. For example, postural supports used to support a person's trunk or torso need to be adjustable in position from side to side and from the front to back of the chair to suit people having different sized torsos and different support needs.

To be moveable, postural supports are typically attached to brackets that attach the postural support to a seat and allow the support to move relative to the seat. For example, the distance between two opposing trunk supports and the height of trunk supports from the base of the seat is typically varied by attaching the trunk support to a bracket that can be attached to the backrest of the chair at different locations. However, a need exists for postural supports to adopt various angled and/or tilted positions to suit the needs of people that tend to slouch forward and/or sideways. A need also exists for a postural support that can be easily moved between a variety of different positions, whether the support is used as a trunk support, a hip support, or a head support.

It is therefore an object of the invention to provide a postural support bracket that is adapted to allow a postural support, when used with the bracket, to adopt various positions, or to at least provide a useful alternative to existing postural support brackets.

SUMMARY OF THE INVENTION

In a first aspect, the invention provides a postural support bracket for a seat comprising a pair of positioning members, each having a first portion, a second portion, and a middle portion extending at an angle between the first and second portion, the first portion being attachable to a seat and the second portion being attached to a support brace, wherein the support brace comprises a body having at least one tilt adjustment slot and wherein the support brace is adapted to rotate about the second portion of each positioning member and wherein the second portion of at least one positioning member is slidingly attached to the tilt adjustment slot to slide along the slot to vary the angle of tilt of the support brace.

In one form, a first of the pair of positioning members is rotatably attached to a body of the support brace and a second of the pair of positioning members is rotatably and slidingly attached to the at least one tilt adjustment slot of the support brace.

Alternatively, the pair of positioning members comprise a first positioning member and a second positioning member and wherein both first and second positioning members are rotatably and slidingly attached to the at least one tilt adjustment slot of the support brace.

Preferably, the second portion of at each positioning member is held within a respective attachment housing attached to the support brace, each attachment housing comprising a channel within which at least a part of the second portion of the respective positioning member is held and that is adapted to allow the second portion of the respective positioning member to rotate about its longitudinal axis within the channel and wherein each attachment housing is also adapted to lock the second portion of the respective positioning member within the channel to prevent further rotation of the respective positioning member and of the support brace.

Preferably, the housing comprises at least one pair of substantially opposing locking arms having inner surfaces that define a channel adapted to receive the second portion of the respective positioning member therein and wherein the housing further comprises fasteners adapted to move the locking arms toward each other to clamp against the second portion of the positioning member held within the channel and to release the locking arms to allow the second portion of the positioning member to rotate about its longitudinal axis within the channel. In a preferred form, the fasteners comprise a threaded bolt and nut. Preferably, the locking arms are biased away from each other to unlock the respective positioning member when the fasteners are released.

In one form, the second portion of each positioning member that is slidingly attached to at last one tilt adjustment slot is held within a respective attachment housing comprising a channel within which at least a part of the second portion of the respective positioning member is held and that is adapted to allow the second portion of the respective positioning member to rotate about its longitudinal axis within the channel and wherein each attachment housing is also adapted to lock the second portion of the respective positioning member within the channel to prevent further rotation of the respective positioning member and of the support brace and wherein the attachment housing is also is adapted to slidingly attach the respective positioning member to the support brace by engagement with the tilt adjustment slot.

Preferably, the at least one tilt adjustment slot lies in a direction that is substantially perpendicular to the longitudinal axis of the second portion of the positioning members. Alternatively, the at least one tilt adjustment slot lies at an angle to the longitudinal axis of the second portion of the positioning members.

Preferably, the support brace comprises two or more substantially parallel tilt adjustment slots.

In one form, the middle portion of each positioning member is substantially perpendicular to the first and second portions.

In one form, support brace is formed in two parts, a first part being hingedly attached to a second part and wherein the first positioning member is rotatably attached to the first part of the support brace and the second positioning member is rotatably attached to the second part of the support brace.

Preferably, the first part and the second part of the support brace each comprise at least one tilt adjustment slot and wherein the second portion of the first and second positioning members are slidingly attached to the at least one tilt adjustment slot on the respective parts of the support brace.

In one form, the first part of the support brace comprises at least two parallel tilt adjustment slots and the first positioning member is slidingly attached to each of these tilt adjustment slots, and wherein the second portion of the first second part of the support brace comprises at least two parallel tilt adjustment slots and the second positioning member is slidingly attached to each of these tilt adjustment slots; and each of the tilt adjustment slots lie in the same direction.

In one form, the first portion of each positioning member is adapted to be rotatably attached to a seat.

Alternatively, the first portion of each positioning member is rotatably attached to a seat attachment bracket comprising a first part adapted to attach to a seat and a second part that is hinged from the first part and to which the positioning members are rotatably attached.

Any reference to prior art documents in this specification is not to be considered an admission that such prior art is widely known or forms part of the common general knowledge in the field.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE FIGURES

Preferred embodiments of the invention will be described by way of example only and with reference to the drawings, in which.

DETAILED DESCRIPTION

Figure 1:
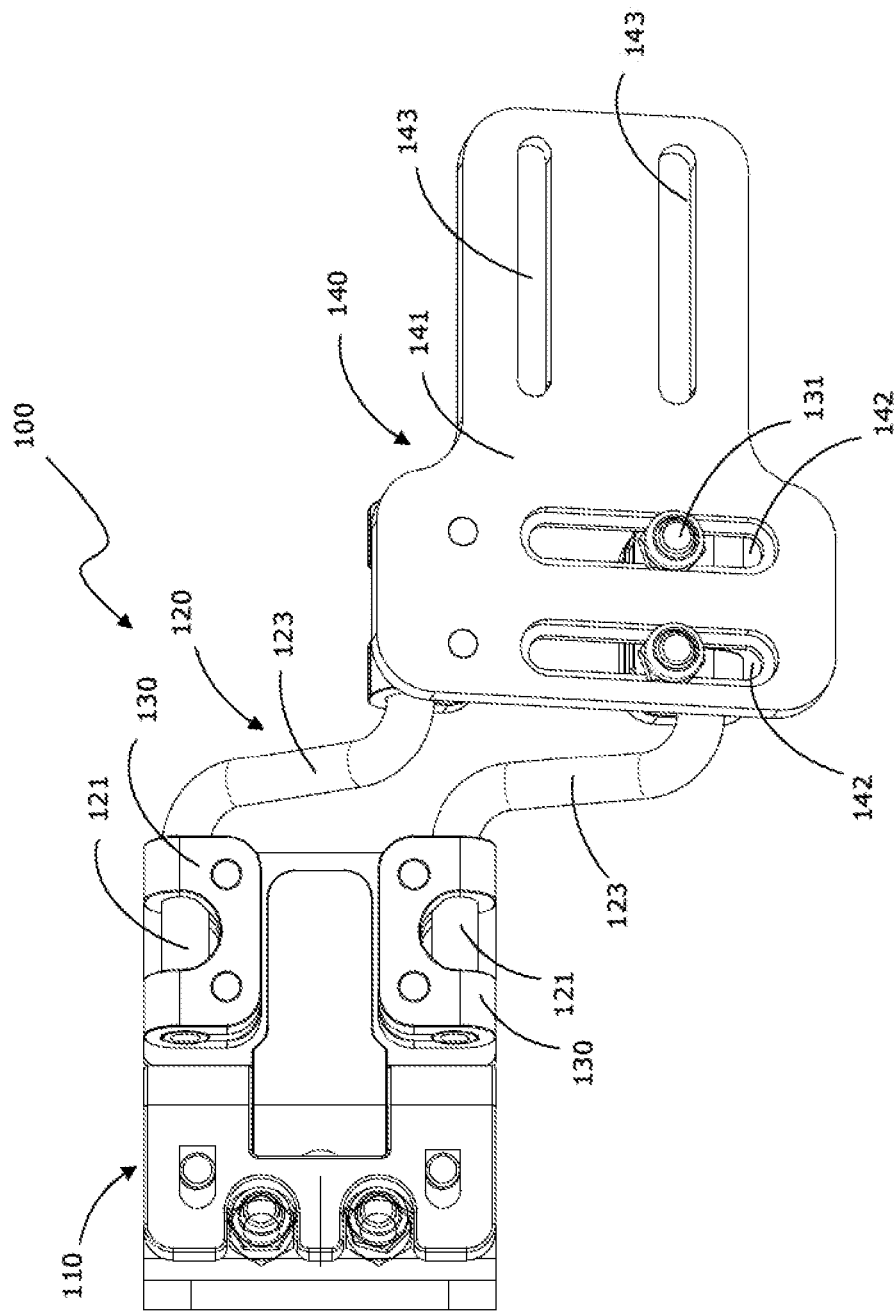
FIG. 1 is a side view of a postural support bracket according to one aspect of the invention.

The postural support bracket of the invention is adapted to attach to attach a postural support to a chair or seat, such as a wheelchair. The postural support is typically in the form of a cushion that presses against the body of a user of the chair to support the user or to assist the user to substantially maintain a desired postural position. The postural support bracket is configured to move between various positions and to be locked in place once the support reaches a desired position. In this way, the bracket allows the attached postural support to be located in a position that suits the support needs of the particular user in order to help the user to maintain a desired seated position within the chair. For example, to support a physically disabled person's trunk or torso when seated in a chair, it is common to provide a postural support at each side of the backrest of the chair. This form of postural support is typically referred to as a 'trunk support'. The postural support bracket of the invention is adapted to be used with many types of postural supports, including trunk supports, and hip supports.

In one form, the postural support bracket is configured so that when two brackets are used, one on either side of a backrest for example, the postural supports may be moved toward and away from each other (i.e. toward and away from the centre line of the backrest) to account for people having different sized torsos and support needs.

In one form, the postural support bracket of the invention is adapted to allow the postural support to be tilted to a desired position. For example, the postural support may be tilted to face upwardly to support a person's torso from below.

In one form, the postural support brackets are also adapted to allow the postural supports to be moved along the postural support brackets. For example, when the postural support brackets are used with a trunk support, the trunk support may be slid along and away from the bracket in a first direction or along and toward the bracket in a second direction, opposite the first direction.

By providing this range of movement, the postural support brackets of the invention allow trunk supports to apply gentle pressure against the person's body when in use and to be moved out of the way when not in use.

In one embodiment, shown in FIGS. 1 to 8, the postural support bracket 100 comprises a seat attachment bracket 110 for attaching the postural support bracket 100 to a seat, a support brace 140 for attaching the postural support bracket 100 to a postural support, and a pair of first and second positioning members 120 that attach the support brace 140 to the seat attachment bracket 110.

The seat attachment bracket 110 may be a substantially L-shaped bracket comprising a hinged arm. The hinged arm comprises a first part 111 to which the positioning members are attached and also comprises a second part 112, which is hinged from the first part 111 via a hinged joint 114.

The second part 112 of the hinged arm is attached to, or integrally formed with, an adjustment plate 113, which may be adapted to adjust the position of the postural support bracket 100 on the seat to which it will be attached. The second part 112 of the hinged arm extends at an angle from the adjustment plate 113. Preferably, the second part 112 is substantially perpendicular to the adjustment plate 113.

The hinged joint 114 within the seat attachment bracket allows the support brace 140 (and therefore the postural support that will be attached to the brace during use) to move toward and away from the adjustment plate 113. In other words, the first part 111 of the hinged joint is able to hinge about the second part 112. For example, when the postural support bracket 100 is used as a trunk support on a seat, the hinged joint allows the support brace to move toward and away from a central region of the backrest of the seat. In effect, the hinged joint 114 allows the support brace 140 and postural support to extend from the sides of the backrest or chair so as to be out of the way when a person sits onto or exits from the chair. The hinged joint 114 may also allow the support brace and postural support to extend forward of the backrest and toward the central region of the backrest or seat. This range of movement is particularly useful for moving the postural support bracket and postural support closer to the user in the chair and for moving the postural support bracket away from the user.

The hinged joint 114 may be configured to be locked in place so that the first part 111 of the joint can be locked in a preferred position relative to the second part 112 of the joint.

The adjustment plate 113 may comprise an adjustment system for adjusting the position of the bracket on the chair. In one form, the adjustment system comprises at least one slot 115 and at least one fastener configured to project through the slot and to attach the adjustment plate to a chair. Preferably, the adjustment plate 113 comprises two or more adjustment slots, as shown best in FIGS. 6, 7, 14, and 15.

In one form, where the postural support bracket is used with a trunk support, the adjustment plate is typically located at or near an outer edge of a backrest of a chair, such as a wheelchair. The adjustment slot(s) of the adjustment plate are positioned to be substantially horizontal, so that the adjustment slot(s) lie in a plane that is substantially parallel to the seat base. At least one fastener projects through a respective adjustment slot and is also attached to the backrest by any suitable means. For example, the fastener may be a screw or nut and bolt arrangement. The fastener is adapted to slide along the slot and to be secured in place to hold the plate in a desired position against the backrest. In this way, the adjustment plate 113 can be slid toward and away from the centre of the backrest by allowing one or more fasteners to slide within the respective adjustment slot(s) 115. Once the postural support bracket is in the desired position, the fastener(s) can be secured, such as by clamping against the adjustment plate, to lock the adjustment plate in position against the backrest.

The seat attachment bracket described above is only one form of bracket that can be used to attach the postural support bracket of the invention to a chair. Any other suitable bracket or means of attachment may be used instead. For example, in another form, the positioning members of the postural support bracket may be attached to brackets formed on the chair itself. Therefore, in this form, the postural support bracket does not include a seat attachment bracket.

In any system for attaching the postural support bracket to a chair, it is important that the positioning members are able to rotate to allow the support brace to be tilted or angled to a desired position.

Returning to the embodiments illustrated in FIGS. 1 to 20, each positioning member 120 comprises a first portion 121 located at one end and a second portion 122 located at the opposing end of the positioning member. The first and second portions of each positioning member each comprise a distal end to form the ends of the positioning member. A third, middle portion 123 is located between the first and second portions 121, 122 at an angle so that the first and second portions of the positioning members are offset from each other and lie along longitudinal axes that are parallel to each other.

Figure 3:
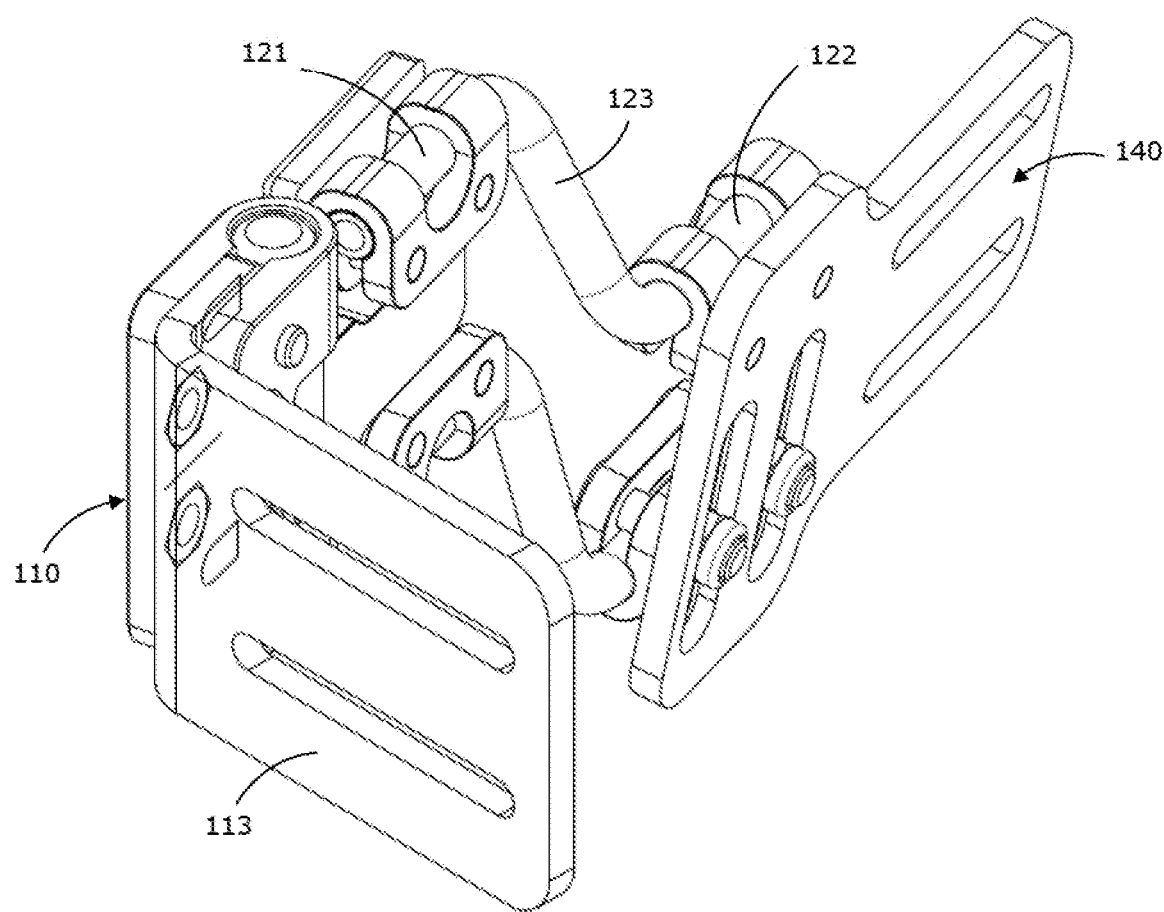
FIG. 3 is a perspective view of the postural support bracket of FIG. 1.
Figure 4:
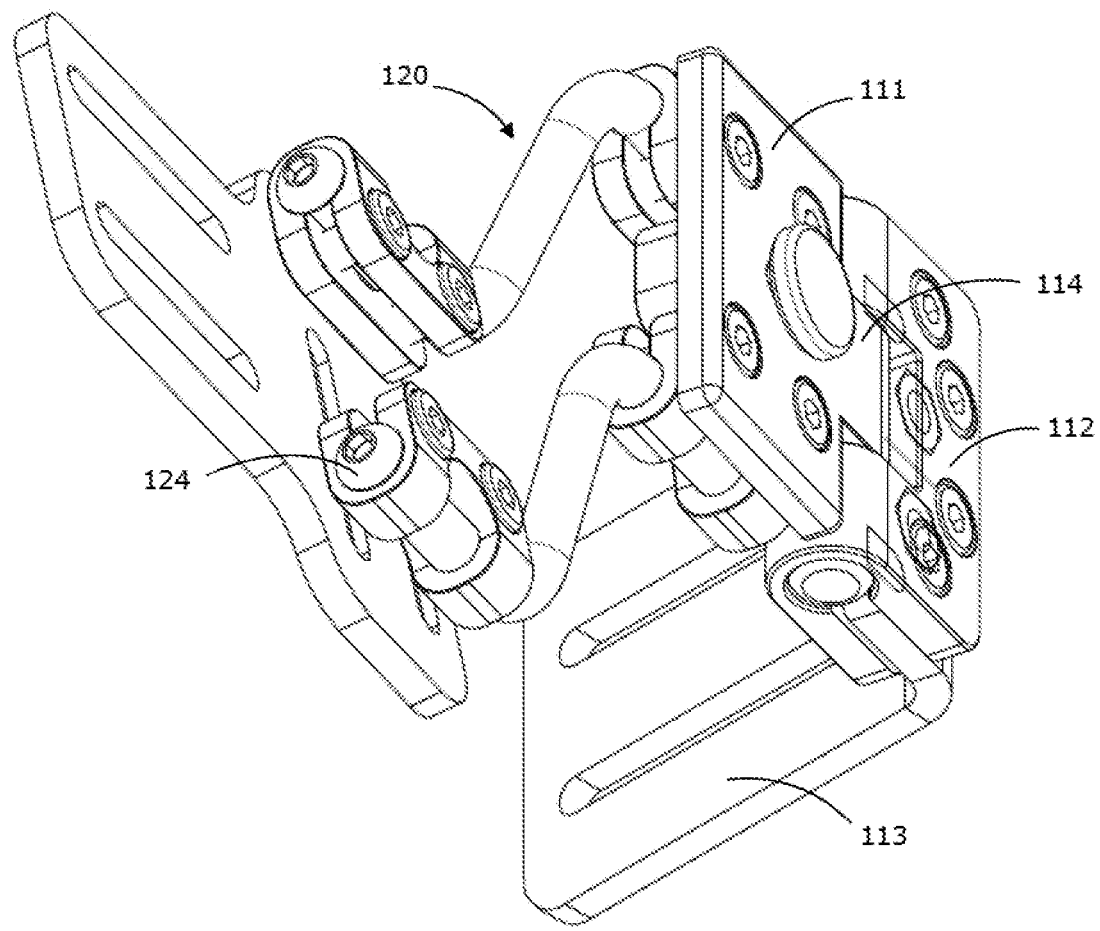
FIG. 4 is another perspective view of the postural support bracket of FIG. 1.
Figure 5:
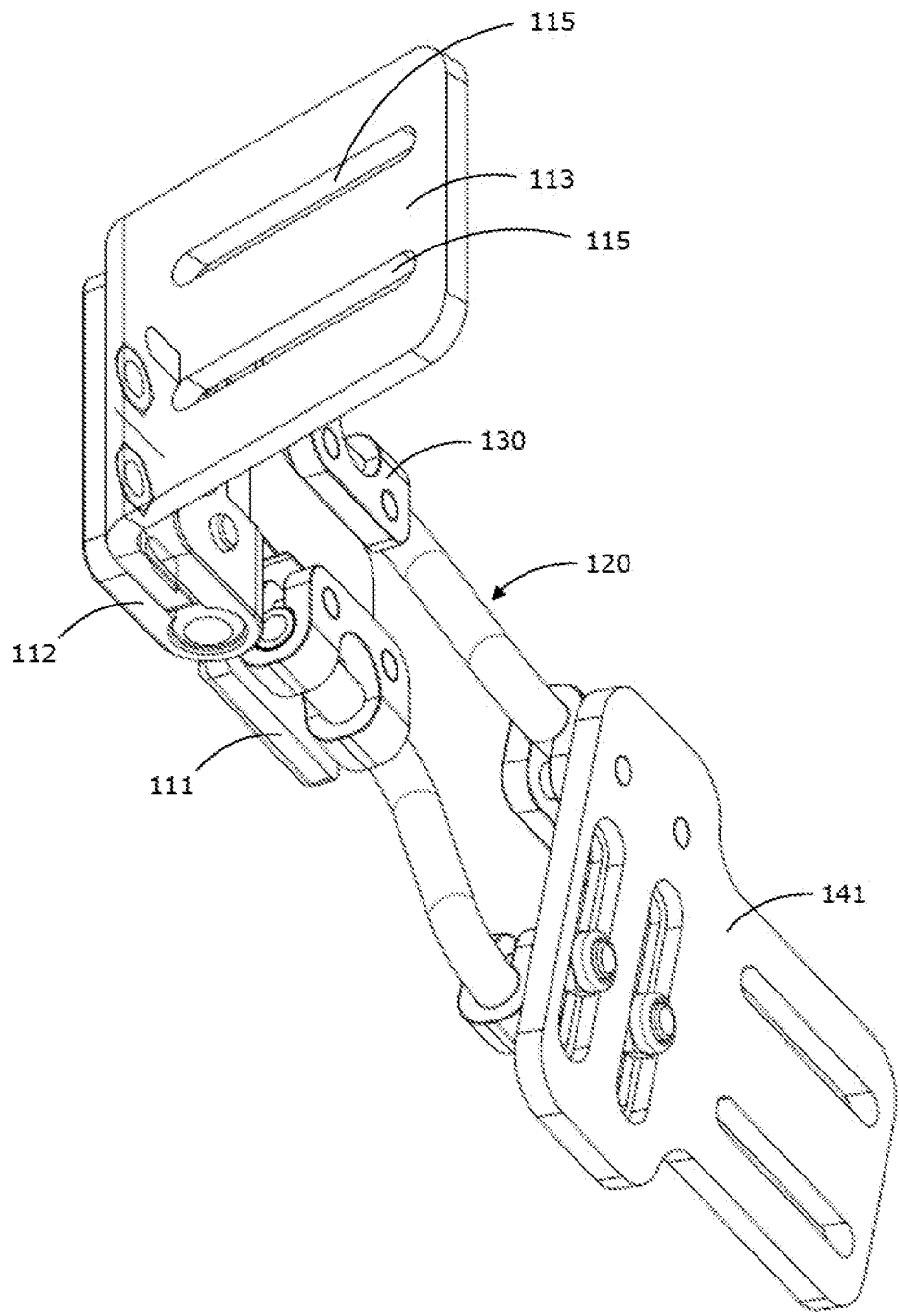
FIG. 5 is another perspective view of the postural support bracket of FIG. 1.
Figure 6:
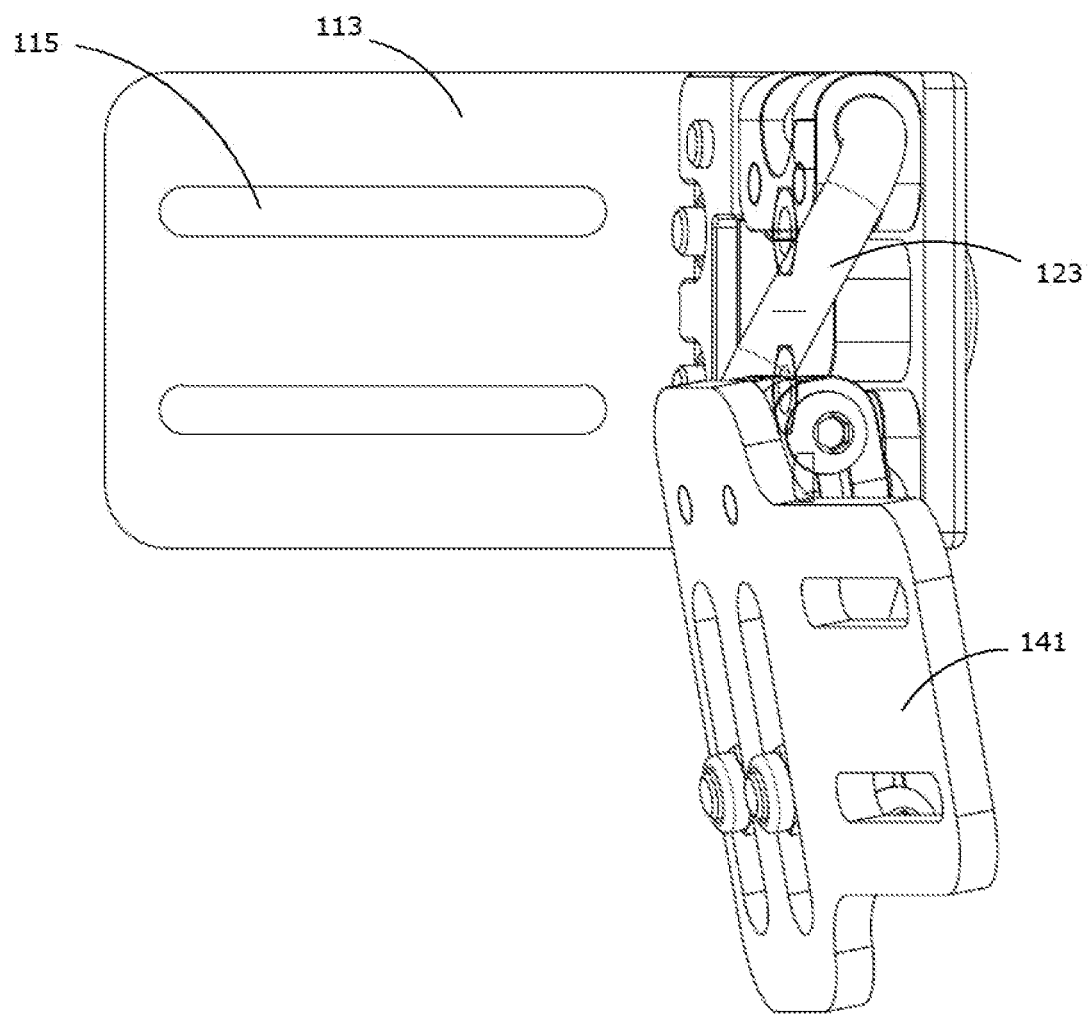
FIG. 6 is a front view of the postural support bracket of FIG. 1.
Figure 7:
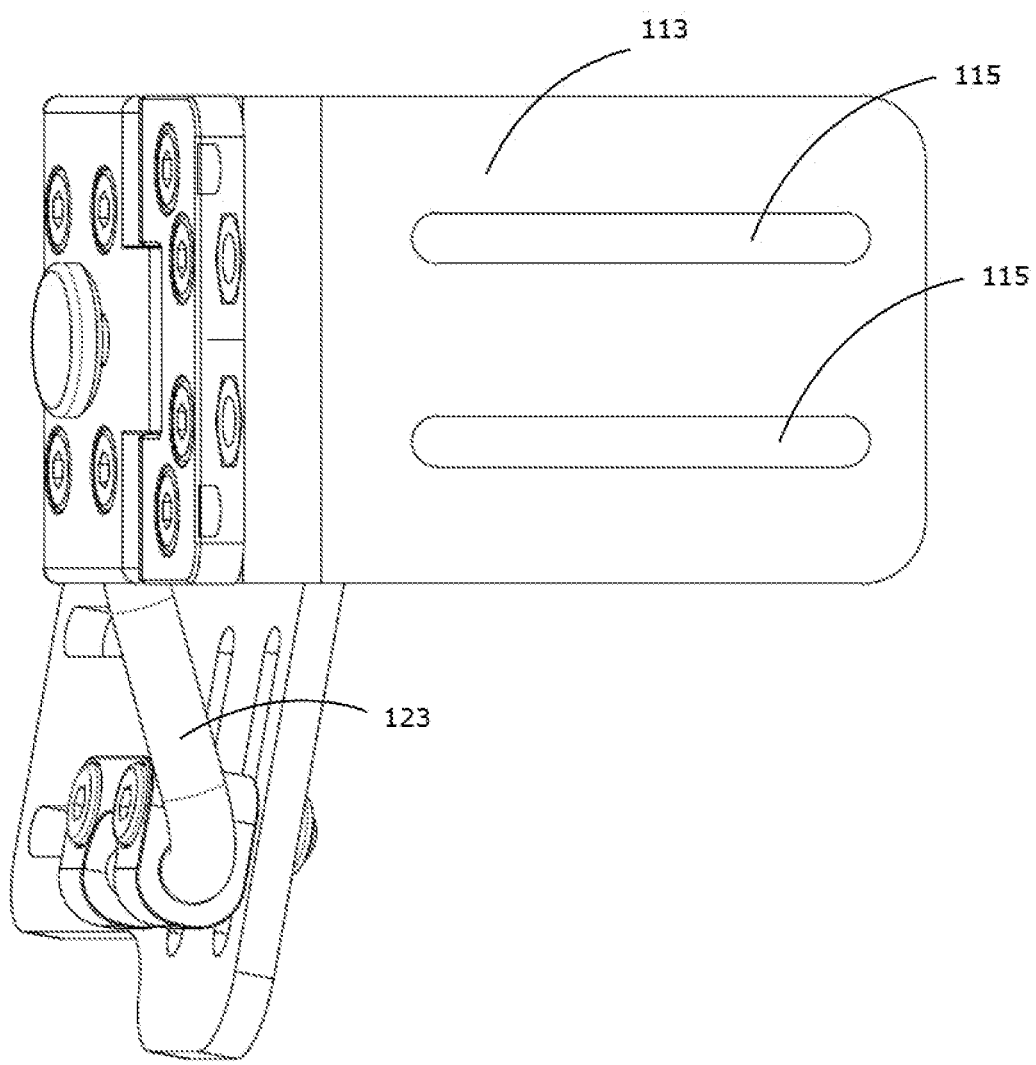
FIG. 7 is a rear view of the postural support bracket of FIG. 1.
Figure 8:
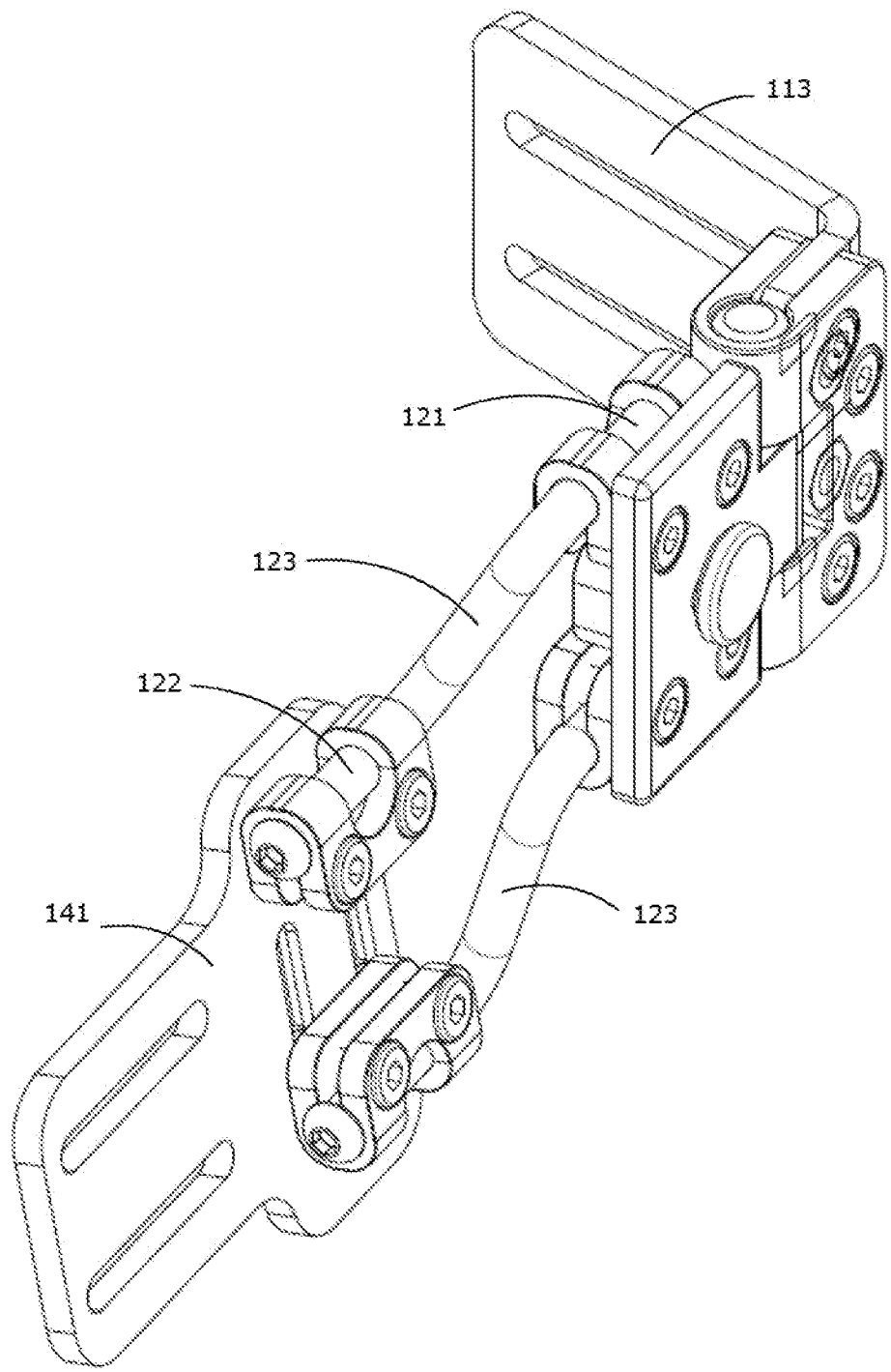
FIG. 8 is yet another perspective view of the postural support bracket of FIG. 1.
Figure 9:
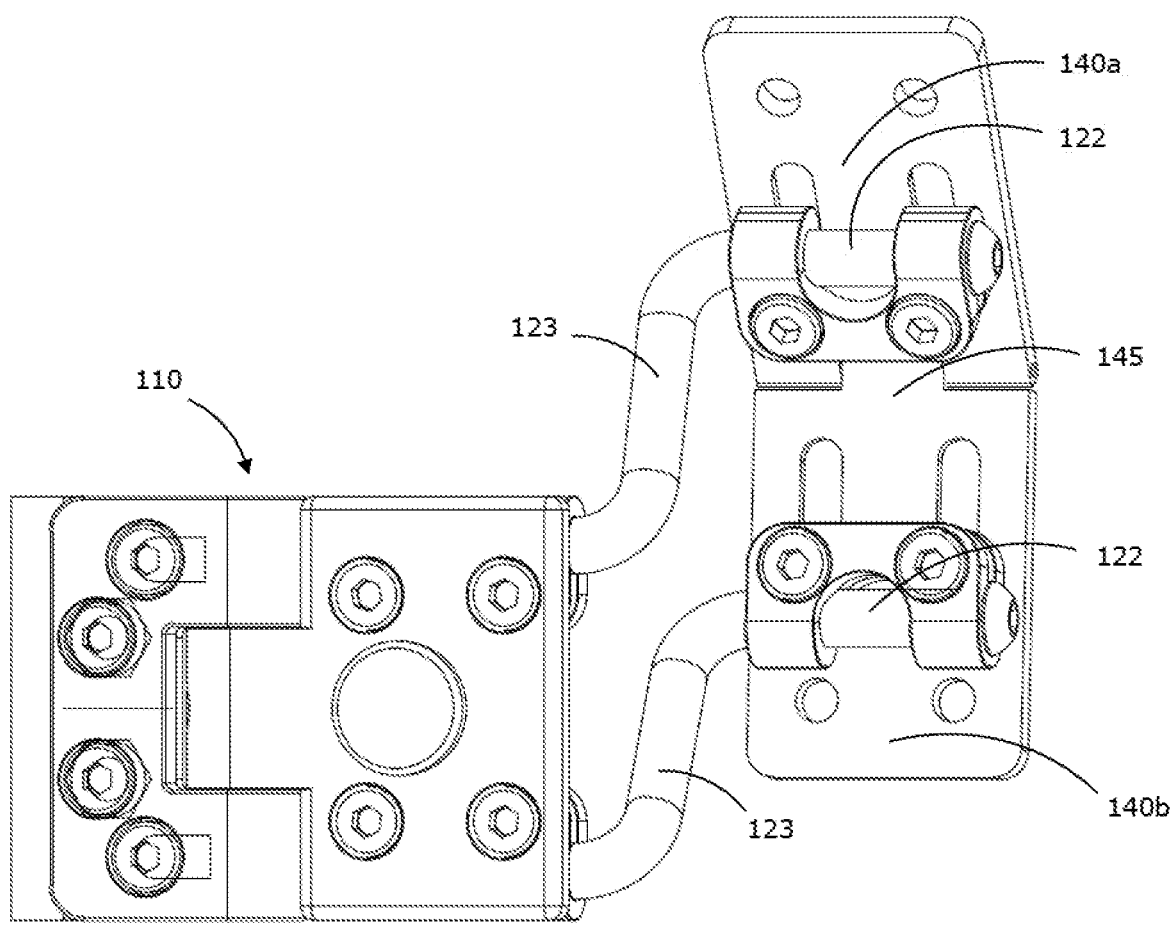
FIG. 9 is a side view of a postural support bracket according to another aspect of the invention.
Figure 10:
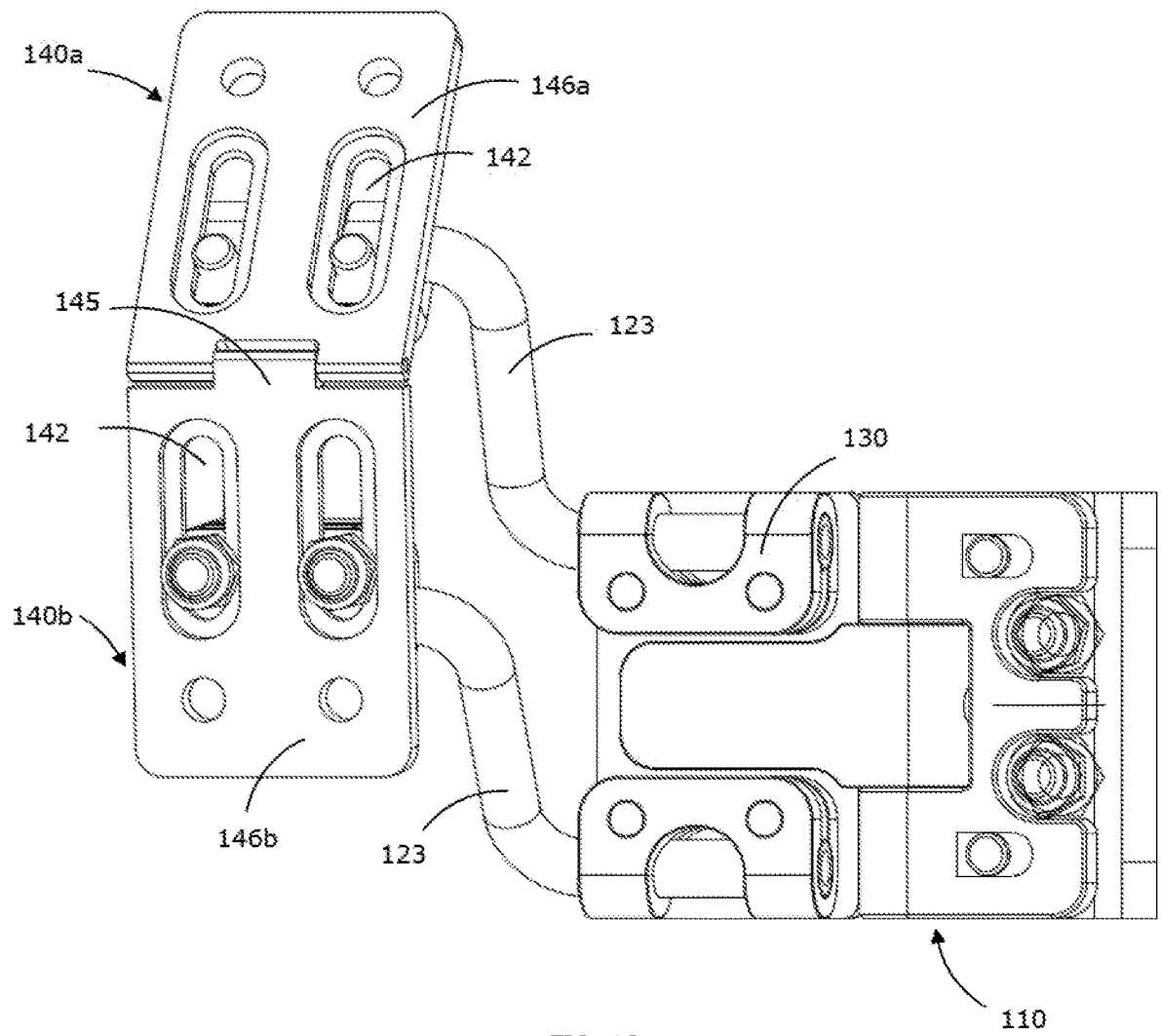
FIG. 10 is an opposite side view of the postural support bracket of FIG. 9.
Figure 11:
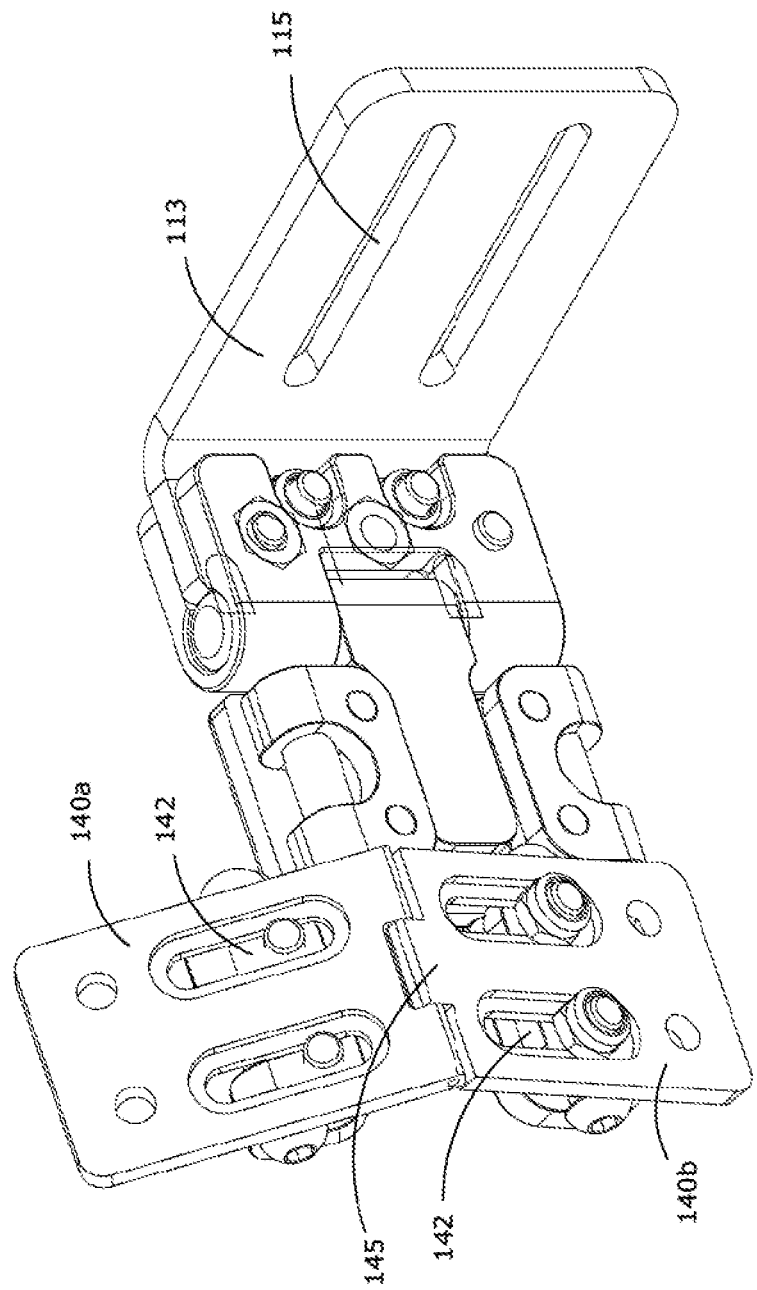
FIG. 11 is a perspective view of the postural support bracket of FIG. 9.
Figure 12:
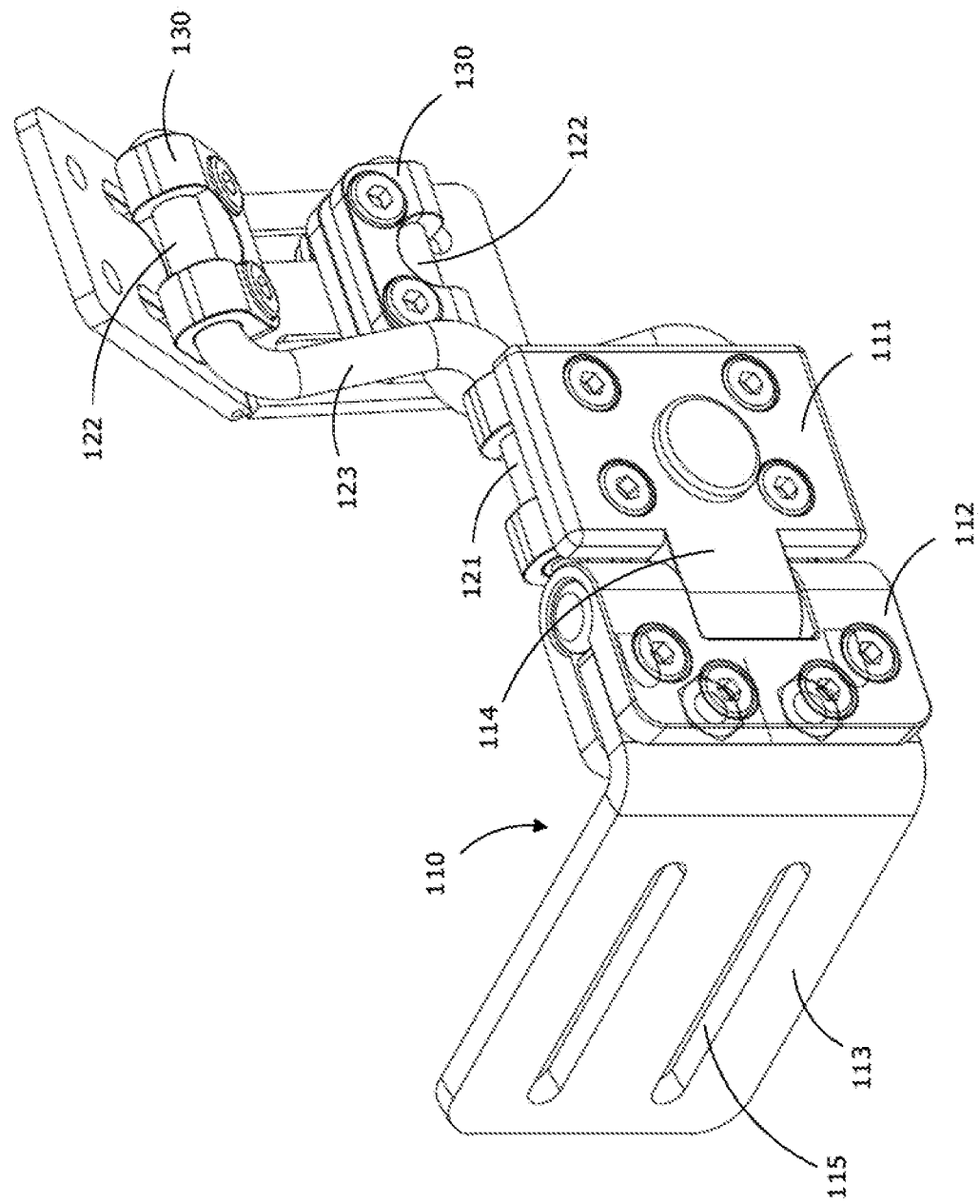
FIG. 12 is another perspective view of the postural support bracket of FIG. 9.
Figure 13:
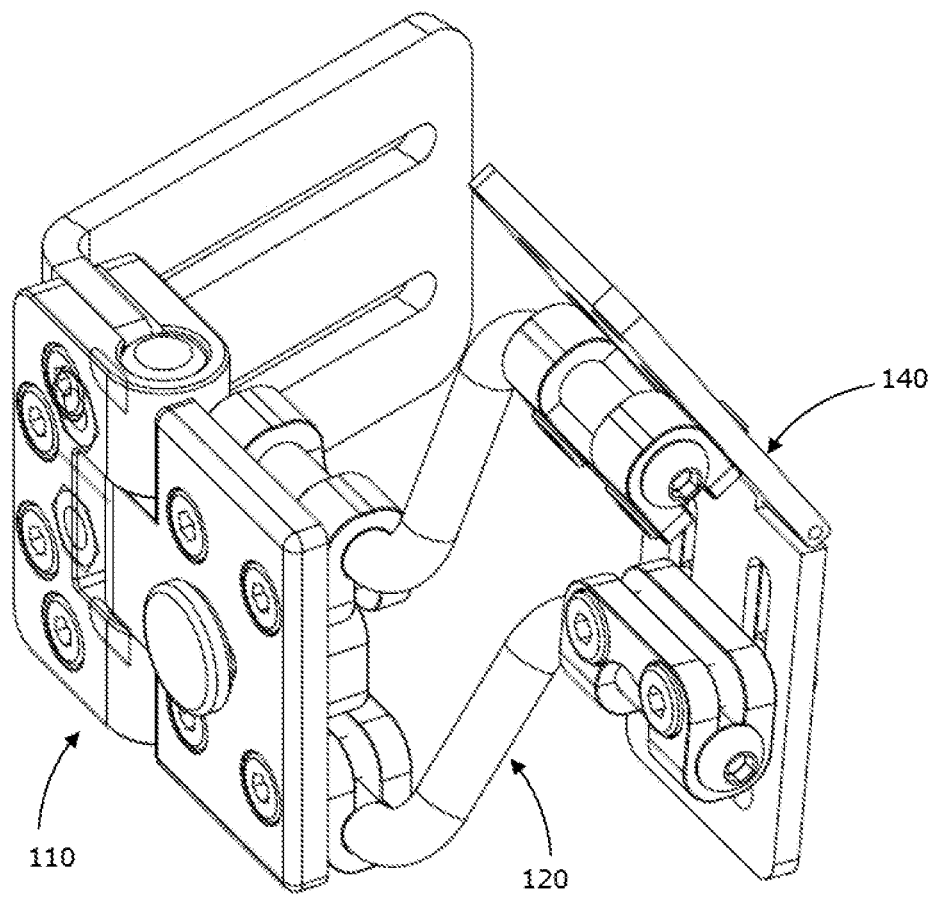
FIG. 13 is another perspective view of the postural support bracket of FIG. 9.
Figure 14:
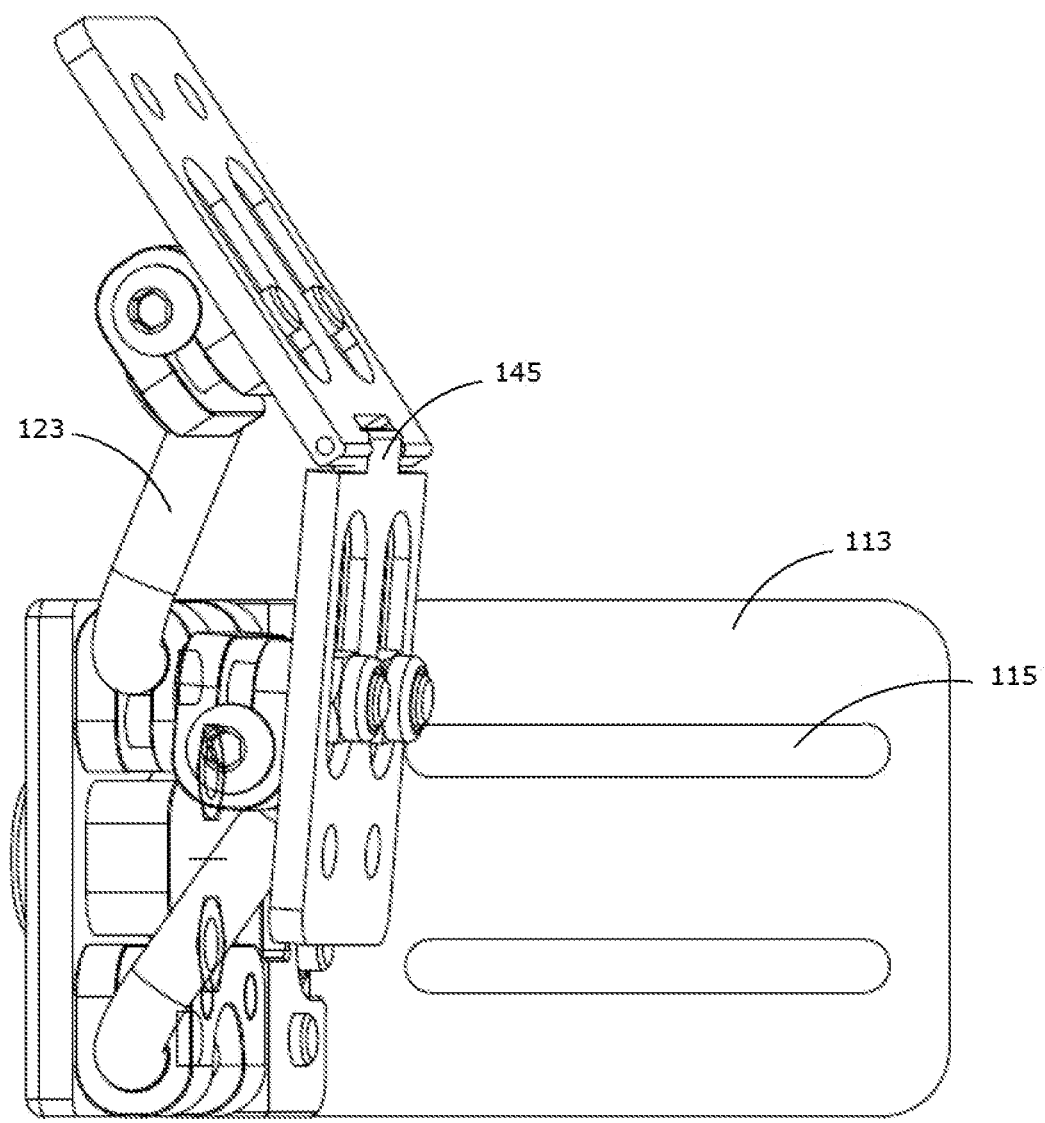
FIG. 14 is a front view of the postural support bracket of FIG. 9.
Figure 15:
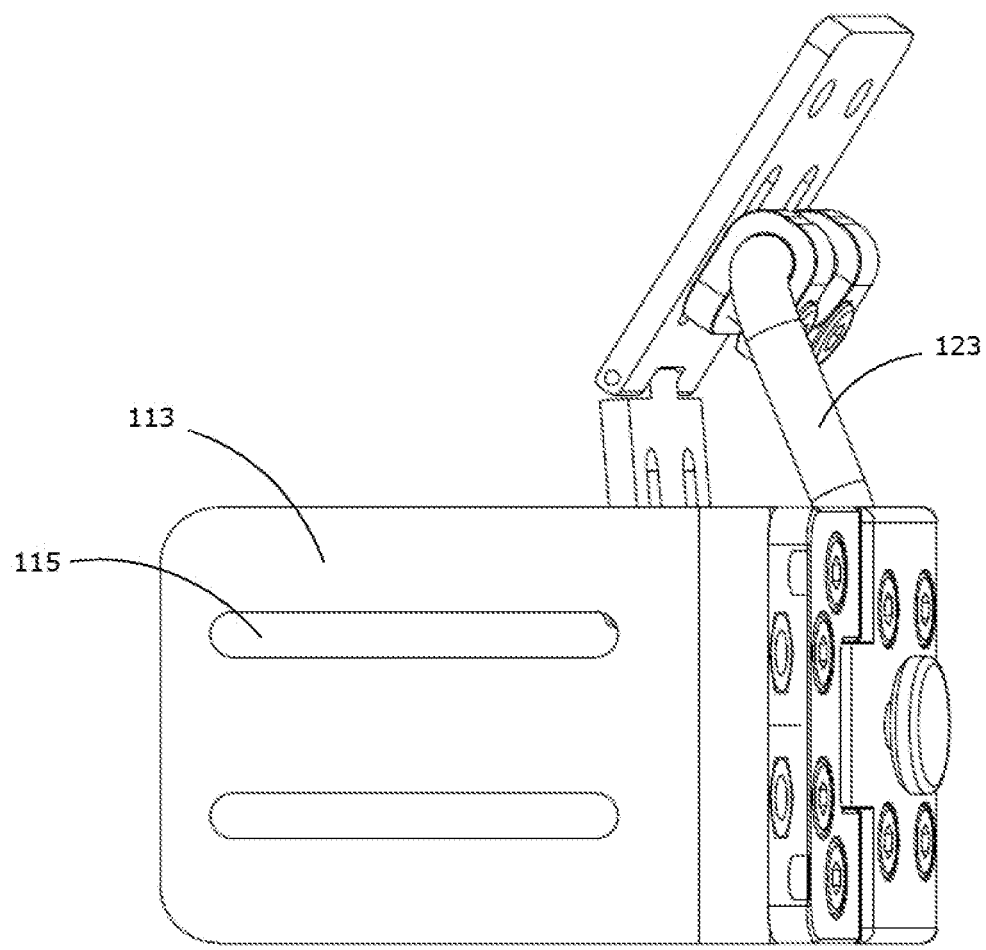
FIG. 15 is a rear view of the postural support bracket of FIG. 9.
Figure 16:
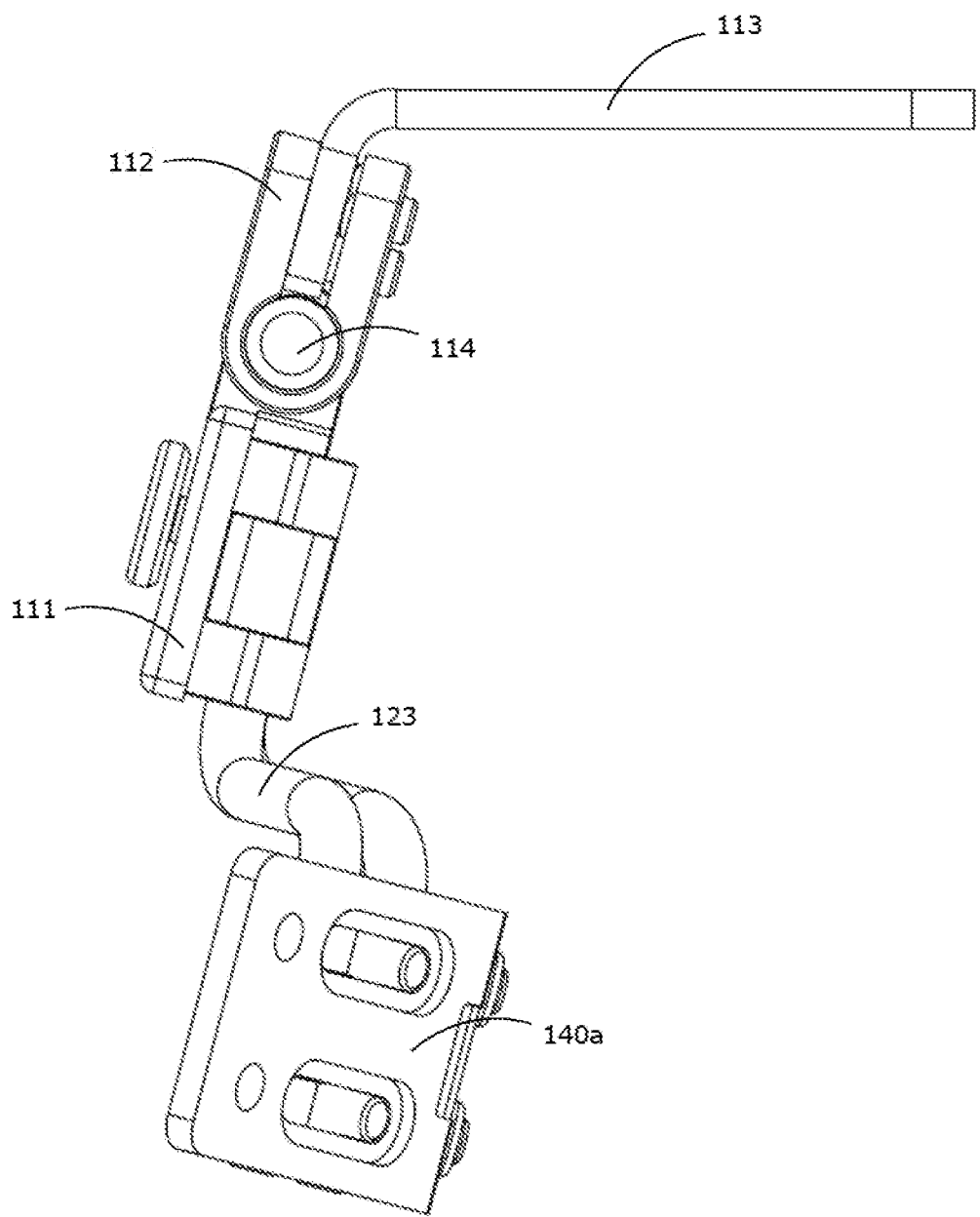
FIG. 16 is a top view of the postural support bracket of FIG. 9.
Figure 17:
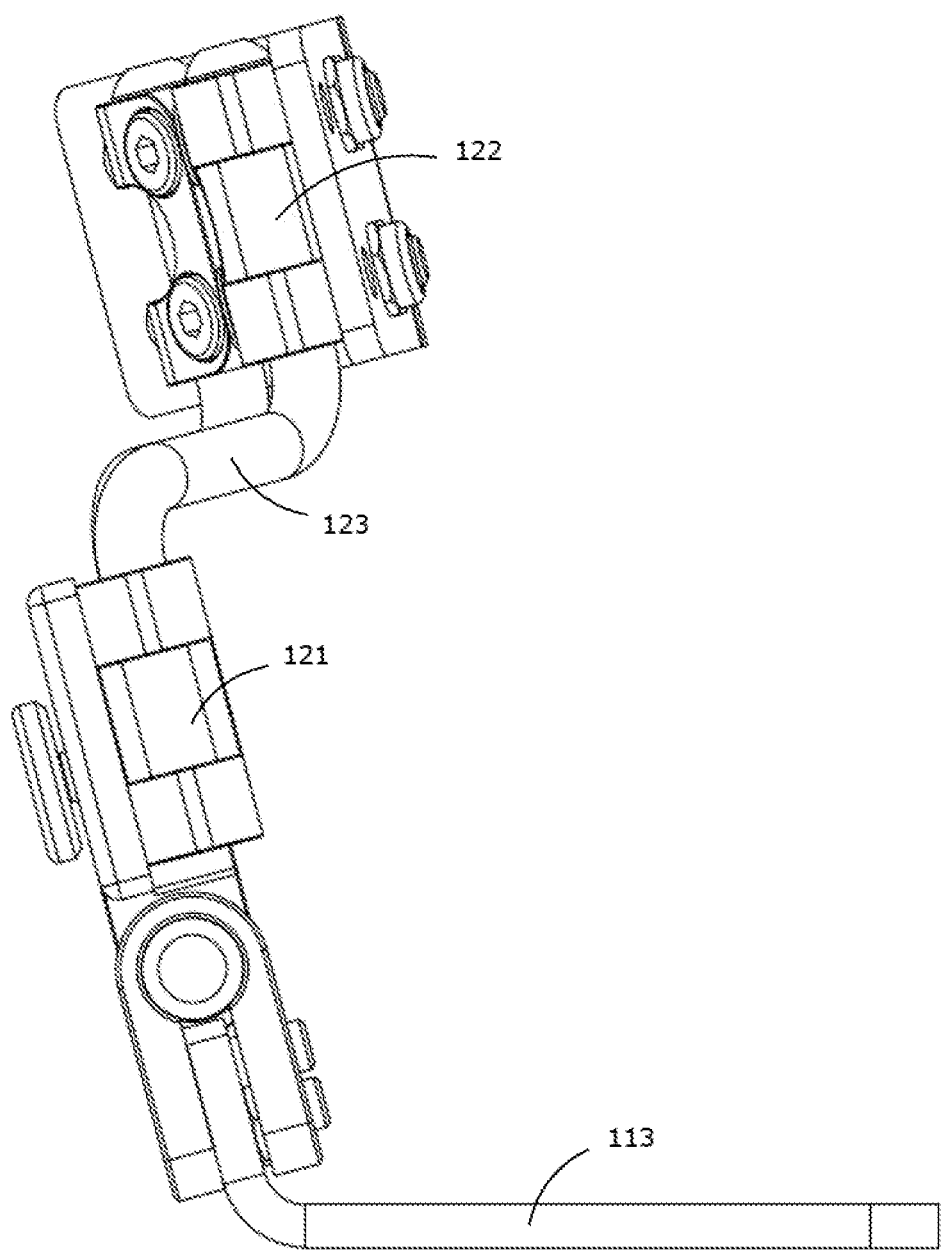
FIG. 17 is a bottom view of the postural support bracket of FIG. 9.

The first portion 121 of each of the positioning members is rotatably attached to the first part 111 of the attachment bracket 110, as shown best in FIGS. 1 and 3. By 'rotatably attached', we mean that the first portion 121 is attached to the attachment bracket in a way that allows the first portion of the positioning member to rotate about its longitudinal axis.

In one form, the first portion of each positioning member is rotatably attached to the attachment bracket 110 using a respective attachment housing 130 that is attached to, or integrally formed with, the first part 111 of the attachment bracket and that comprises a channel through which at least part of the first portion 121 of the respective positioning member 120 extends. A stopper 124 is provided at or near the distal end of the first portion 121 to prevent the positioning member 120 from pulling out of the housing 130. In effect, the attachment housing 130 provides a sleeve that substantially surrounds at least part of the first portion 121 of the respective positioning member 120 so that the positioning member can freely rotate within the sleeve but cannot be removed from the sleeve.

In one form, the attachment housing comprises at least one pair of opposing locking arms having an inner surface that defines a channel, which is shaped to receive a portion of a positioning member. Preferably, the attachment housing comprises at least two pairs of opposing locking arms, one at each end of the housing, as shown in the accompanying Figures. The locking arms are preferably biased apart. At least one fastener may be provided for each pair of locking arms and is adapted to move the arms toward each other to clamp around the positioning member and prevent further rotation of the positioning member. Conversely, the fastener is also adapted to release the locking arms to allow the positioning member to rotate within the housing.

In one form, the fastener comprises a nut and bolt arrangement that engage with a respective pair of locking arms of the attachment housing. By screwing the nut toward the bolt head, the locking arms are pushed toward each other to lock the positioning member in position. Conversely, by screwing the nut away from the bolt head, the locking arms move apart from each other to allow the positioning member to rotate about its longitudinal axis within the housing. The channel and the first portion of the positioning member are sized to allow the first portion 121 to rotate about its longitudinal axis within the channel, when the housing fasteners are released, and to be held firmly in position, when the fasteners cause the locking arms of the housing to move toward each other.

However, it should be appreciated that the housing for the first portion of each positioning member may be replaced with any suitable attachment system that allows the positioning member to be rotatably attached to the seat attachment bracket and to be held in a desired position.

In another form, the first portion of each positioning member of the postural support bracket may be substantially held within an attachment housing that is located on a chair, so that the positioning members are rotatably attached to the chair. In this form, the postural support bracket does not require a seat attachment bracket.

Each positioning member also comprises a third, middle portion 123, which is located between the first and second portions 121, 122 and extends at an angle from the first and second portions 121, 122. Preferably, the middle portion 123 is substantially perpendicular to the first and second portions 121, 122 so that the longitudinal axes of the first and second portions 121, 122 are offset and substantially parallel to each other. In one form, as illustrated, each positioning member comprises an elongate bar that is substantially z-shaped.

The second portion 122 of each positioning member is rotatably attached to the support brace 140 so that the second portion of the positioning member can rotate about its longitudinal axis regardless of whether the support brace is moving or not.

In one form, the second portion of each positioning member is attached to the support brace using a respective attachment housing 130. The attachment housing comprises at least one pair of opposing locking arms having inner surfaces that define a channel in which at least part of the second portion 122 is held, to attach the positioning member to the support brace. Again, one or more fasteners may be used to move the locking arms toward each other to lock the second portion of the positioning member within the housing so that rotation of the positioning member is prevented. Conversely, the fasteners are also adapted to release the locking arms to allow the second portion to rotate about its longitudinal axis within the attachment housing, as described above. Again, the channel and the second portion of the positioning member are sized to allow the second portion 122 to rotate about its longitudinal axis within the channel when the housing fasteners are released, and to be held firmly in position, when the fasteners push the locking arms of the housing toward each other.

A stopper 124 is provided at or near the distal end of the second portion of the positioning member to prevent the positioning member 120 from pulling out of the housing 130.

As described above, the locking arms and fastener(s) of the attachment housing 130 form a kind of sleeve that substantially surrounds at least part of the second portion 122 of the respective positioning member 120 so that the positioning member can rotate within the sleeve but cannot be removed from the sleeve. However, it should be appreciated that the attachment housing for the second portion of each positioning member may be replaced with any suitable attachment system that allows the positioning members to be rotatably attached to the support brace.

The support brace comprises at least one tilt adjustment slot 142. Optionally, the support brace comprises two or more tilt adjustment slots.

At least one positioning member is rotatably engaged with a respective tilt adjustment slot so that the positioning member can slide along the slot 142, as shown clearly in FIG. 1. The positioning member can rotate about its longitudinal axis and the support brace can rotate about the second portion of the positioning member to reach a desired angle of tilt.

In one form, the second portion 122 of at least one positioning member is held within an attachment housing 130 as described above. One or more fasteners of the attachment housing form one or more projecting engagement members that extend through the respective slot(s) 142. The one or more engagement members are adapted to be held within the slot(s) so that the attachment housing 130 is able to slide along the slot(s) but cannot be pulled out of or removed from the slot(s).

In one form, each engagement member comprises a threaded rod or bolt that engages with a pair of opposing locking arms of the attachment housing. Each engagement member also comprises a clamping member, such as a nut, that is adapted to engage with the threaded rod or bolt. A head of the rod or bolt is located on one side of the support brace and the clamping member is located on the other side. As the clamping member is screwed toward the head of the rod or bolt, the locking arms are pushed toward each other, as described above. Conversely, as the clamping member is released, the locking arms are also released and are able to return to their natural state so that the second end of the respective positioning member can rotate about its longitudinal axis within the attachment housing.

In one form, the attachment housing comprises a pair of locking arms and the support brace comprises a pair of tilt adjustment slots. The fasteners engaged with the locking arms are each also slidingly engaged with a respective tilt adjustment slot.

By clamping a clamping member against the support brace, the respective attachment housing is also clamped tight against the support brace and is prevented from sliding further along the tilt adjustment slot(s). This prevents the respective positioning member from moving along the tilt adjustment slot(s). At the same time, the clamping member pushes the locking arms of the attachment housing toward each other to clamp around the second portion of the positioning member held within the housing. In this way, when the support bracket of the invention is in the desired position, the engagement members are locked in place within the tilt adjustment slots to prevent the support brace (and therefore the postural support) from moving relative to the attachment housing(s) that are engaged with the support brace. In addition, the positioning members are locked within the respective attachment housings to prevent further rotation and therefore to lock the angle of tilt of the support brace and of a postural support when attached to the support brace.

Figure 2:
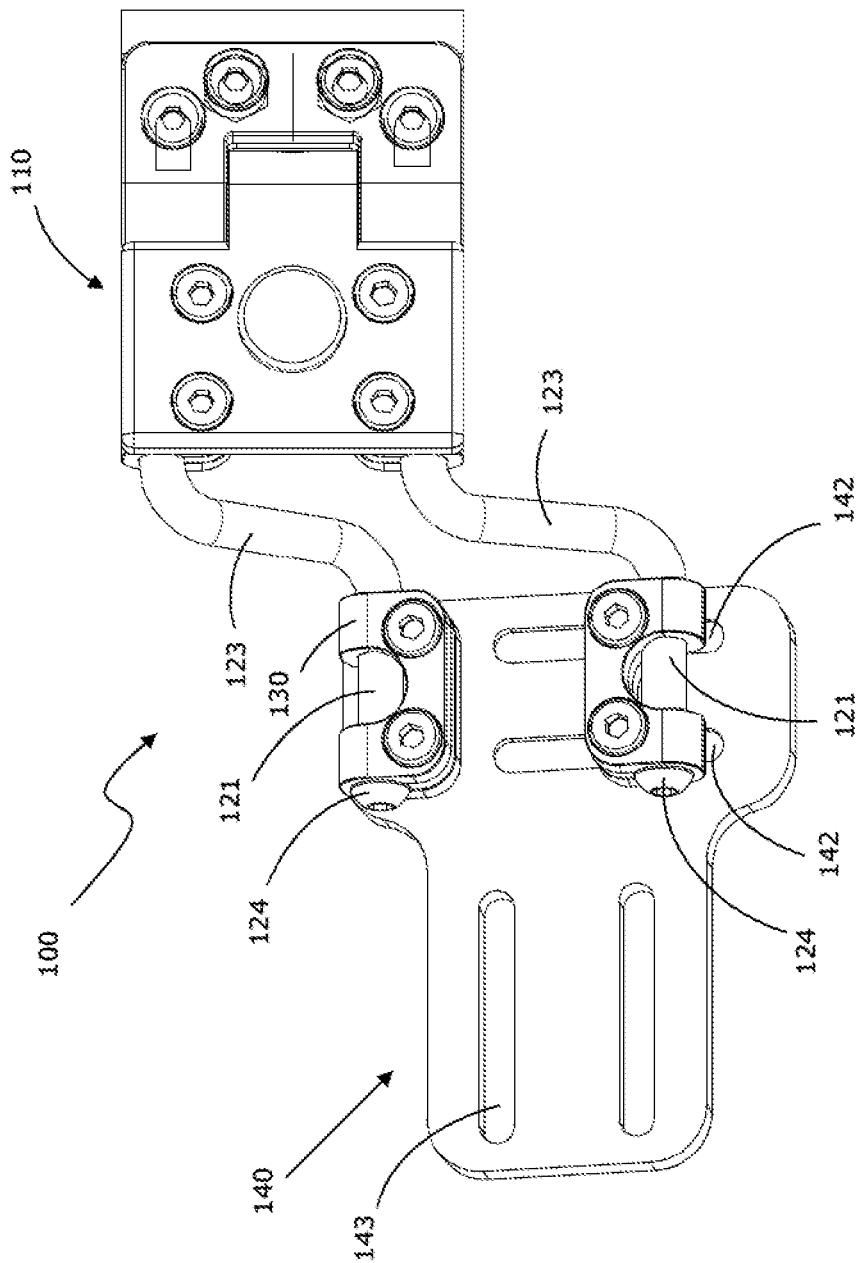
FIG. 2 is an opposite side view of the postural support bracket of FIG. 1.

In one form, the tilt adjustment slot(s) 142 extend substantially perpendicular to the longitudinal axis of the second portion 122 of the positioning members, as shown in FIGS. 1 and 2. In another form, the tilt adjustment slot(s) extend substantially diagonally relative to the longitudinal axis of the second portion of the positioning members.

In one form, the second portion 122 of the first positioning member is rotatably attached to the body 141 of the support brace 140 and the second portion of the second positioning member is rotatably attached to and slidingly attached to the tilt adjustment slot(s), as described above. For example, in the embodiment shown in FIGS. 1 to 8, the first positioning member 120 is held within a first attachment housing 130 (as described above) that is attached to the body of the support plate 140. The first attachment housing is unable to move with respect to the support plate. However, the first positioning member is able to rotate about its longitudinal axis within the first attachment housing and is able to be held firmly within the housing by clamping the locking arms of the housing around the second portion 122 of the first positioning member, as described above. The second positioning member 120 is held within a second attachment housing 130 that is slidingly attached to a pair of tilt adjustment slots 142. Again, the second positioning member is able to rotate within the second attachment housing unless locked in position by the locking arms. The second attachment housing (and therefore the second positioning member) is able to slide along the tilt adjustment slots as the support brace is tilted to the desired angle. Once the desired angle of tilt is reached, the locking arms of the second attachment housing are engaged to clamp against the support brace and against the second portion of the second positioning member to hold the support brace and the second positioning member in position.

In another form, both the first and second positioning members are rotatably and slidingly attached to one or more tilt adjustment slots. In this form, the second portion 122 of each positioning member is housed within a respective attachment housing 130, as described above, and the housing 130 is slidingly engaged with one or more tilt adjustment slots. In this form, one or more tilt adjustment slots may extend across the body of the support brace so that the attachment housings of both positioning members engage with the one or more slots. Alternatively, rather than providing one or more long tilt adjustment slots extending across the support brace, the support brace may comprise shorter tilt adjustment slots so that each attachment housing engages with a separate slot or slots. For example, at least one tilt adjustment slot may extend across a first portion of the support brace and at least one other slot may extend across a second portion of the support brace. In this form, the tilt adjustment slots on each portion are substantially in line with each other.

In yet another form, as shown in FIG. 9 to 18, the postural support bracket of the invention comprises a support brace 140 formed in two parts, a first part 140a and a second part 140b. Each of the first and second part comprises a front face 146a and also comprises a rear face 146b (to which the positioning members are attached). The first and second parts are hinged together via a hinged joint 145, which allows the first and second parts 140a, 140b to pivot toward and away from each other. The hinged joint is adapted to be locked when the first and second parts are in a desired position.

Each of the first and second parts 140a, 140b comprise at least one tilt adjustment slot 142. In this form, the first positioning member is rotatably and slidingly attached to the first part 140a of the support brace and the second positioning member is rotatably and slidingly attached to the second part 140b of the support brace. Each positioning member may be rotatably and slidingly attached to the respective positioning slot(s) by a respective attachment housing, as described above, that attaches to the support brace and is able to slide along the tilt adjustment slot(s) of the support brace. However, any other suitable form of attachment may be used. In this form, a postural support 200 is able to be angled to support a person whose torso tends to bend and slouch sideways.

In one form, the support brace comprises at least one postural support adjustment slot 143. Optionally, the support brace comprises two or more postural support adjustment slots. The at least one postural support adjustment slot 143 is positioned at an angle to the at least one tilt adjustment slot 142. In one form, as shown in FIGS. 1 to 8, two postural support adjustment slots 143 are substantially perpendicular to two tilt adjustment slots 142. The postural support 200 may be attached to and slidingly engaged with the postural support adjustment slot(s) so as to be able to slide along the length of the postural support adjustment slot(s) to reach a desired position.

The postural support bracket may be used with postural supports for supporting a person's torso (i.e. a trunk support); a person's thigh (i.e. a hip/leg) support a person's head (i.e. a head support); or for suitably supporting any other region of a person's body to assist his or her posture.

Figure 19:
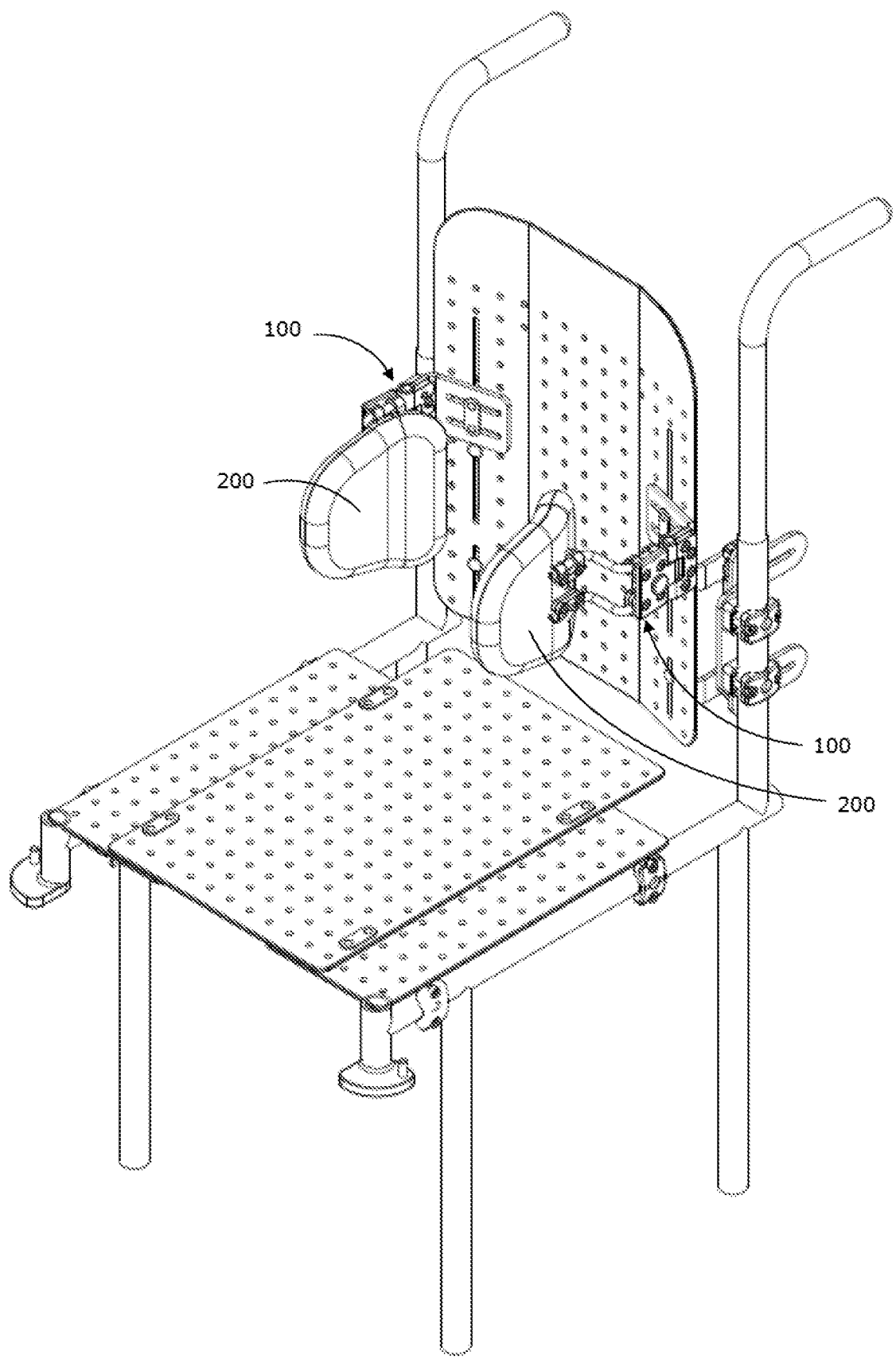
FIG. 19 is a perspective view of a pair of postural supports and postural support brackets brackets according to one aspect of the invention when attached to a wheelchair frame.

For the purpose of exemplification only, the use of a postural support bracket for the invention will now be described in relation to a trunk support. To support a person's torso or trunk when the person is sitting in a chair, a postural support bracket is attached to the backrest of a chair, as described above. Often, a postural support bracket will be attached to the right side of the backrest and another postural support bracket will be attached to the left side of the backrest so that the support brace of each bracket extends toward the front of the chair. The postural support may be attached to the support brace before fitting the postural support brackets to the chair or afterward. Usually, the postural support would be fitted to the postural support bracket first and then the bracket would be attached to the chair, as shown in FIG. 19.

Figure 20:
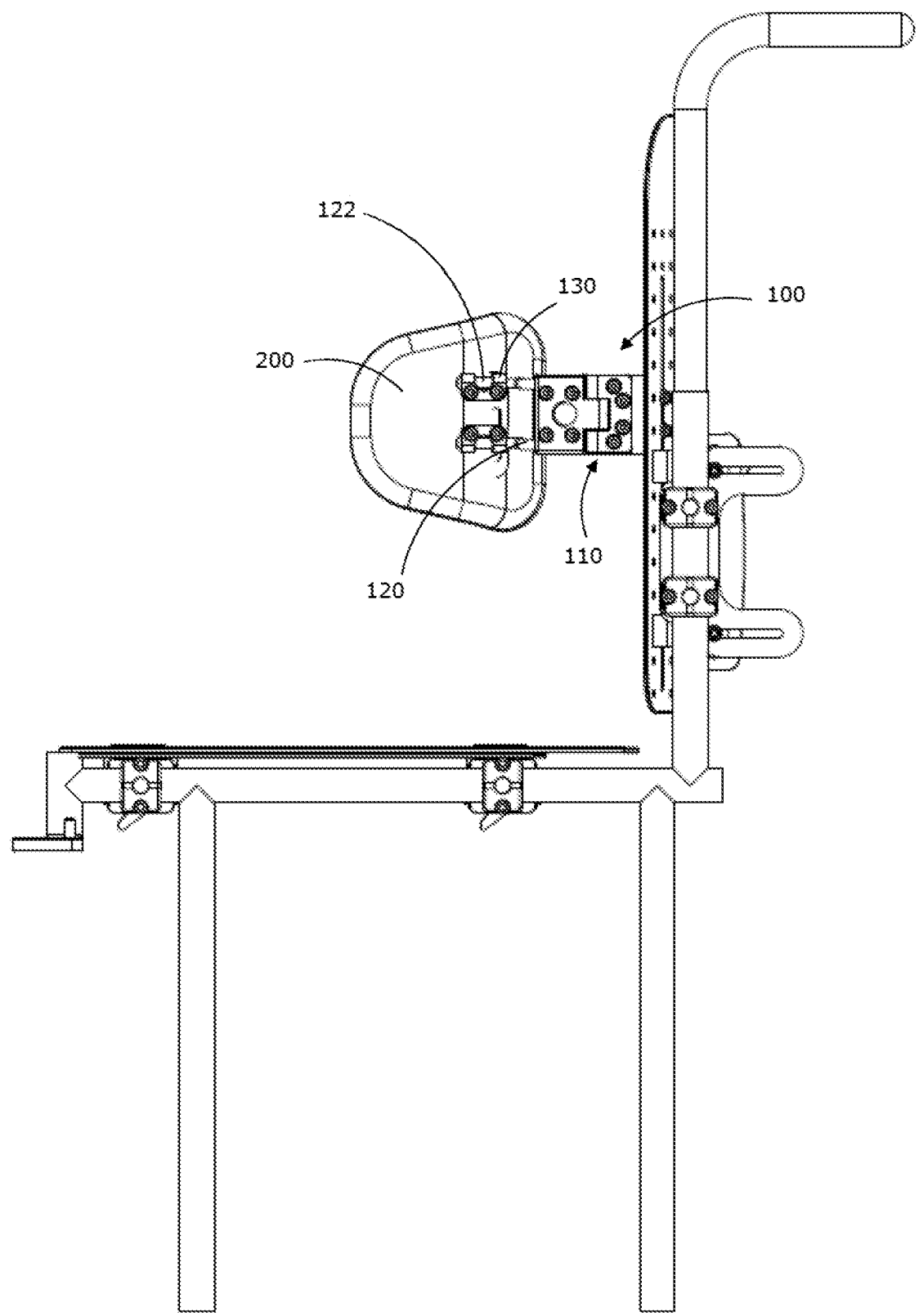
FIG. 20 is a side view of a postural support and postural support bracket according to one aspect of the invention when attached to a wheelchair frame.

If the postural support bracket is attached to the chair using a seat attachment bracket having adjustment slots or using a similar attachment system, the brackets may be slid outward toward the sides of the backrest or inwards toward the vertical centre line of the backrest to suit the width of the person's torso. The hinged seat attachment bracket also allows the postural support bracket and support cushion to be pushed to the side and out of the way as the person gets into and out of the chair, as shown in FIG. 20.

The hinged seat attachment bracket is locked in the desired position to cause the positioning members to extend toward the front of the chair. A person may be seated in the chair before or after this point.

The positioning members can be rotated to cause the support brace and postural support to move toward the torso of the person in the chair.

Figure 18:
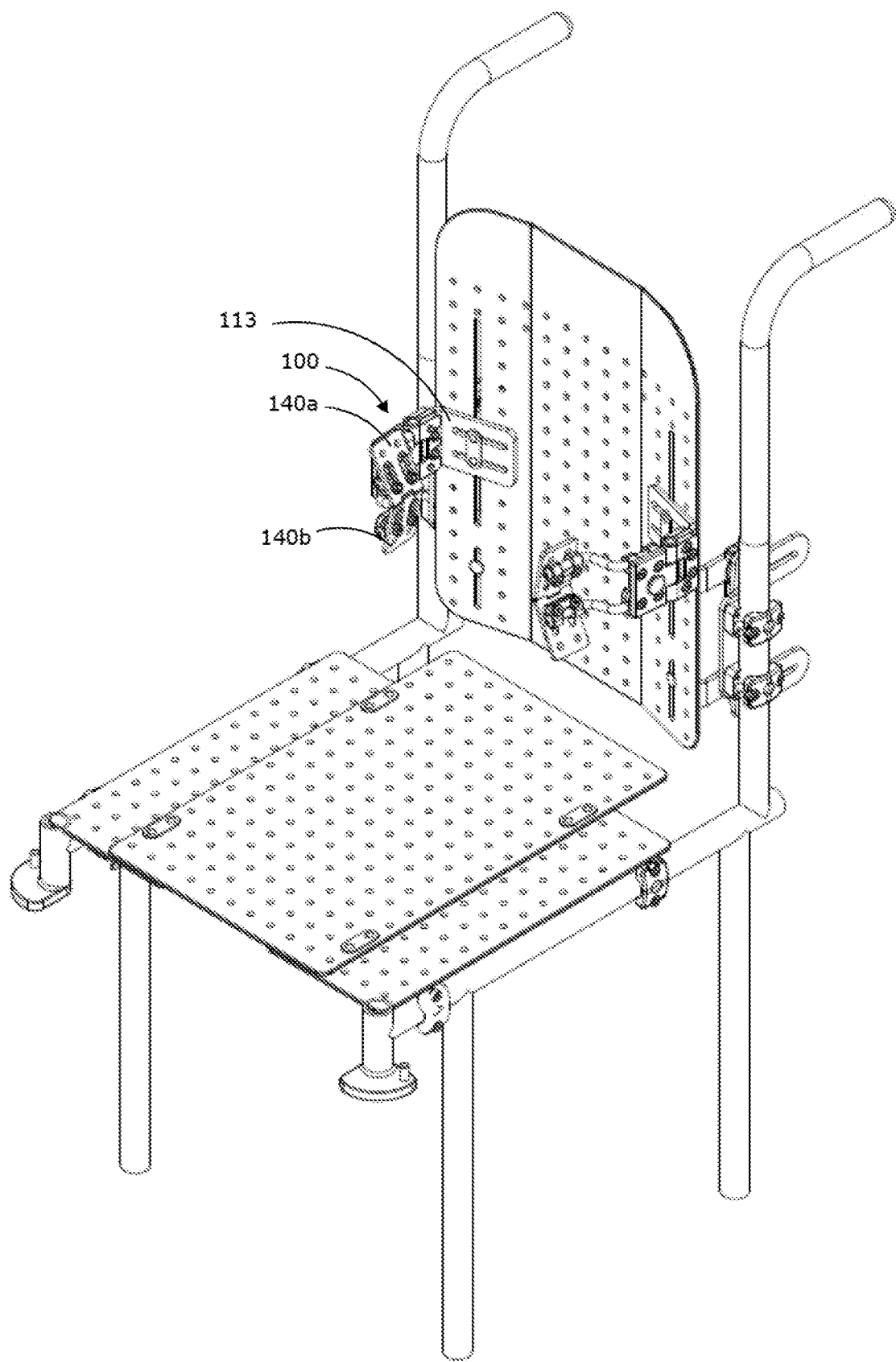
FIG. 18 is a perspective view of the postural support bracket of FIG. 9 attached to a wheelchair frame.

The support brace, and therefore also the postural support, can be rotated about the longitudinal axis of the second portion of the positioning members to tilt the support brace and postural support. In this way, the invention allows the postural support to be pushed up against the ribcage of the person in the chair or against the person's chest region, for example, to help reduce the extent to which the person slumps forward or sideways.

Where the bracket of the invention comprises a split support brace, the front surfaces of the first and second parts can be hinged away from each other to form a shape similar to an arrow head, as shown in FIG. 18. The postural support is adapted to mould to a similar shape so that it can push up beneath a person's ribcage, side, arm pit, or other suitable region of the body to help the person maintain a desired posture. Conversely, the front surfaces of the first and second parts can be hinged toward each other to cause the postural support to adopt a substantially cupped shape that can press against the curves of a person's side, for example, to help the person maintain a desired posture.

When the postural support is in the desired position, the locking arms, fasteners, and hinge locks are secured to hold the postural support bracket and the postural support in that position.

One or more of the components and functions illustrated in the figures may be rearranged and/or combined into a single component or embodied in several components without departing from the invention. Additional elements or components may also be added without departing from the invention.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A postural support bracket for a seat comprising a first positioning member and a second positioning member, each positioning member having a first portion, a second portion, and a middle portion extending at an angle between the first and second portions, wherein the first portion is rotatably attachable to the seat and the second portion is rotatably attached to a support brace,
   wherein the support brace comprises a body comprising at least one tilt adjustment slot, and wherein the second portion of at least one positioning member is slidingly engaged with the at least one tilt adjustment slot by a respective attachment system to vary an angle of tilt of the support brace, and
   wherein the support brace is formed in two parts, a first part being hingedly attached to a second part and wherein the first positioning member is rotatably attached to the first part and the second positioning member is rotatably attached to the second part to allow the support brace to rotate about the second portion of each positioning member,
   wherein the attachment system is adapted to prevent rotation of the second portion of the respective positioning member to lock an angle of tilt of the first and second parts of the support brace.

2. A postural support bracket according to claim 1, wherein each of the positioning members is attached to the support brace by a respective attachment system that comprises a pair of opposing clamping arms adapted to clamp the second portion of the respective positioning member between the clamping arms to prevent rotation of the respective positioning member.

3. A postural support bracket according to claim 1, wherein the at least one tilt adjustment slot lies in a direction that is generally perpendicular to longitudinal axes of the second portions of the first and second positioning members.

4. A postural support bracket according to claim 1, wherein the support brace at least one tilt adjustment slot comprises two or more generally parallel tilt adjustment slots and the respective attachment system slidingly engages with both of the parallel tilt adjustment slots.

5. A postural support bracket according to claim 1, wherein the middle portion of each positioning member is generally perpendicular to longitudinal axes of the first and second portions.

6. A postural support bracket according to claim 1, wherein the first portion of each of the first positioning member and the second positioning member is rotatably attached to the seat by a seat attachment bracket comprising a first part of the seat attachment bracket hinged from a second part of the seat attachment bracket, the second part of the seat attachment bracket being attachable to the seat and the first part of the seat attachment bracket being attached to the first positioning member and the second positioning member.

7. A postural support bracket according to claim 6, wherein the second part of the seat attachment bracket is generally perpendicular to an adjustment plate that comprises at least one adjustment slot to slidingly attach the seat attachment bracket to the seat.

8. A postural support bracket according to claim 1, wherein the first and second parts of the hinged support brace each comprise a front face and wherein an angle formed between the front face of the first and second parts can be varied between an acute angle and an obtuse angle.

9. A postural support bracket according to claim 1, wherein one of the first positioning member and the second positioning member is slidingly engaged with the at least one tilt adjustment slot by the respective attachment system to vary the angle of tilt of the support brace and the second portion of the other of the first positioning member and the second positioning member is rotatably attached to the body of the support brace at a fixed location.

10. A postural support bracket for a seat comprising a first positioning member and a second positioning member, each positioning member having a first portion extending along a first longitudinal axis, a second portion extending along a second longitudinal axis, and a middle portion extending at an angle between the first and second portions, wherein the first portion of each positioning member is rotatably attachable to the seat to rotate about a first longitudinal axis of the positioning member and the second portion is rotatably attached to a support brace to rotate about a second longitudinal axis of the positioning member,
    wherein the support brace comprises a body comprising a first part and a second part that is hinged from the first part, wherein the first part and the second part each comprise a front face and a rear face,
    wherein the first part comprises at least one tilt adjustment slot and an attachment system that receives the second portion of the first positioning member and slidingly engages with the at least one tilt adjustment slot,
    wherein the second part comprises at least one other tilt adjustment slot and another attachment system that receives the second portion of the second positioning member and slidingly engages with the at least one other tilt adjustment slot of the second part,
    and wherein an angle formed between the front face of each of the first and second parts can be varied by sliding at least one of the first positioning member and the second positioning member along the respective tilt adjustment slot, and wherein the attachment systems of the first and second parts are adjustable to prevent rotation of the second portion of the respective positioning member to lock the angle between the front faces of the first and second parts.

11. A support brace according to claim 10, wherein the angle formed between the front faces of the first and second parts can be varied between an acute angle and an obtuse angle.

12. A postural support bracket for a seat comprising a pair of positioning members, each having a first portion, a second portion, and a middle portion extending at an angle between the first and second portion, the first portion being attachable to the seat and the second portion being attached to a support brace, wherein the support brace comprises a body having at least one tilt adjustment slot, wherein the support brace is adapted to rotate about the second portion of each positioning member and wherein the second portion of at least one positioning member is slidingly attached to the at least one tilt adjustment slot to slide along the slot to vary the angle of tilt of the support brace, wherein the support brace is formed in two parts, a first part being hingedly attached to a second part and wherein the first positioning member is rotatably attached to the first part of the support brace and the second positioning member is rotatably attached to the second part of the support brace.

* * * * *